June 12, 1945. W. M. FULTON 2,377,874
AUTOMATIC STOKER
Filed Aug. 11, 1938 11 Sheets-Sheet 1

Inventor
Weston M. Fulton
By Cyrus Kehr & Swecker
his Attorneys

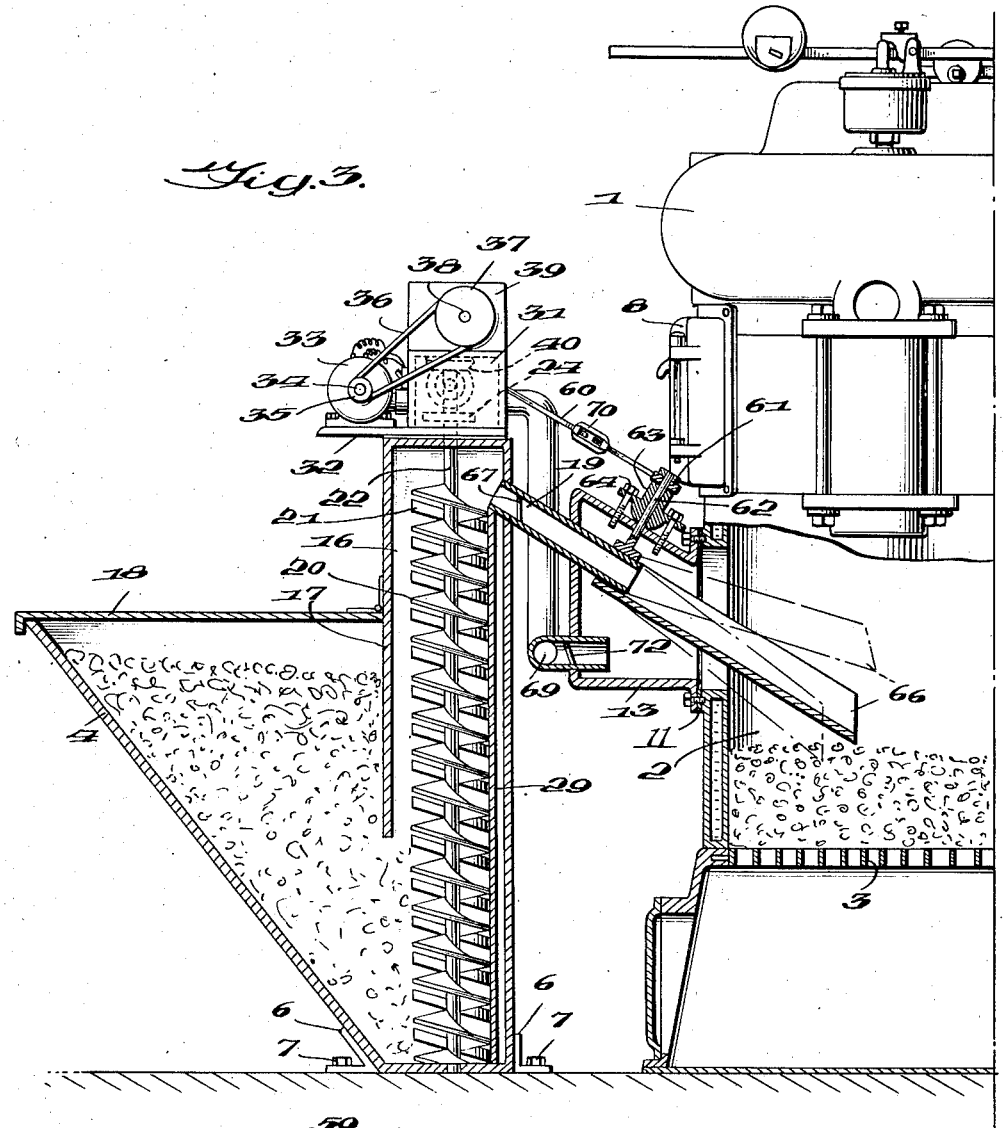

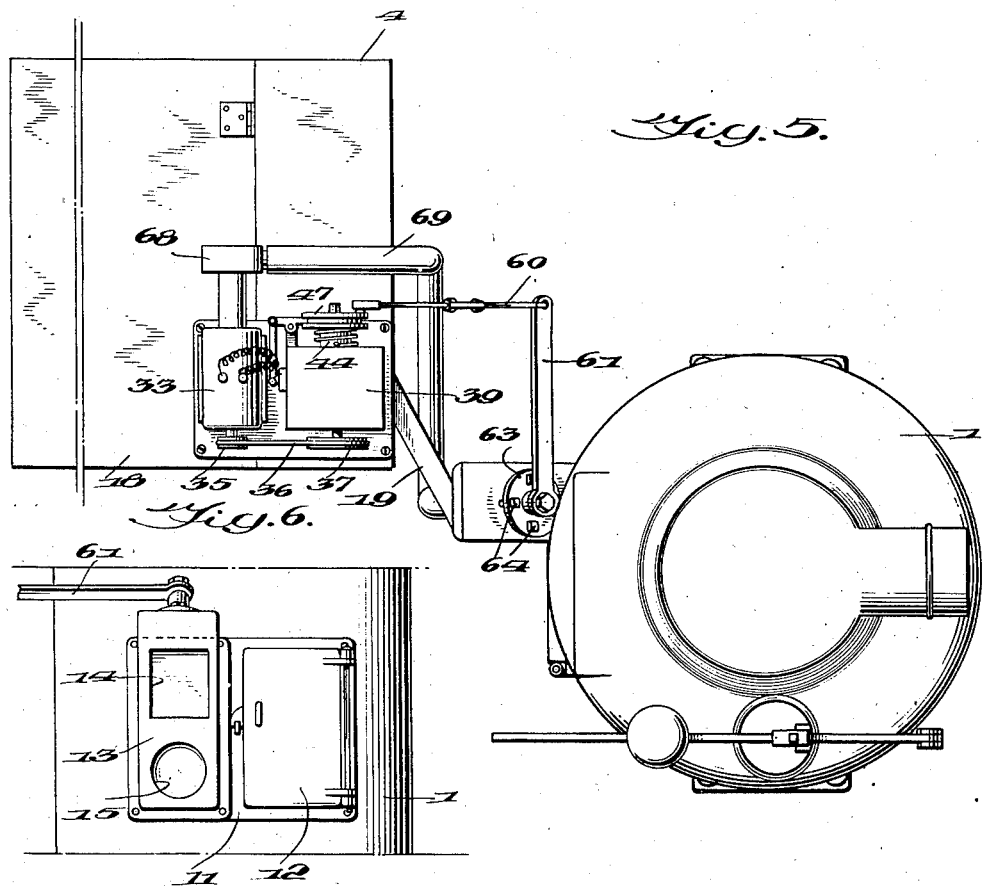
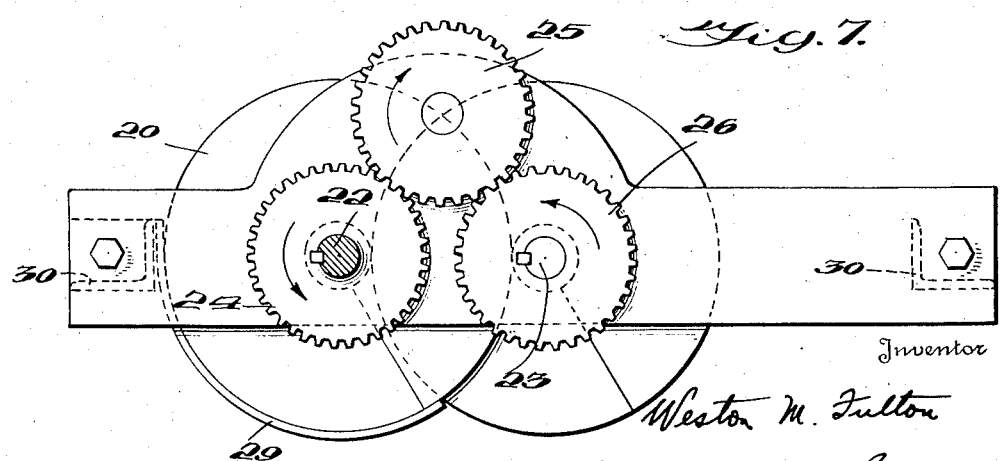

June 12, 1945.  W. M. FULTON  2,377,874
AUTOMATIC STOKER
Filed Aug. 11, 1938  11 Sheets-Sheet 4
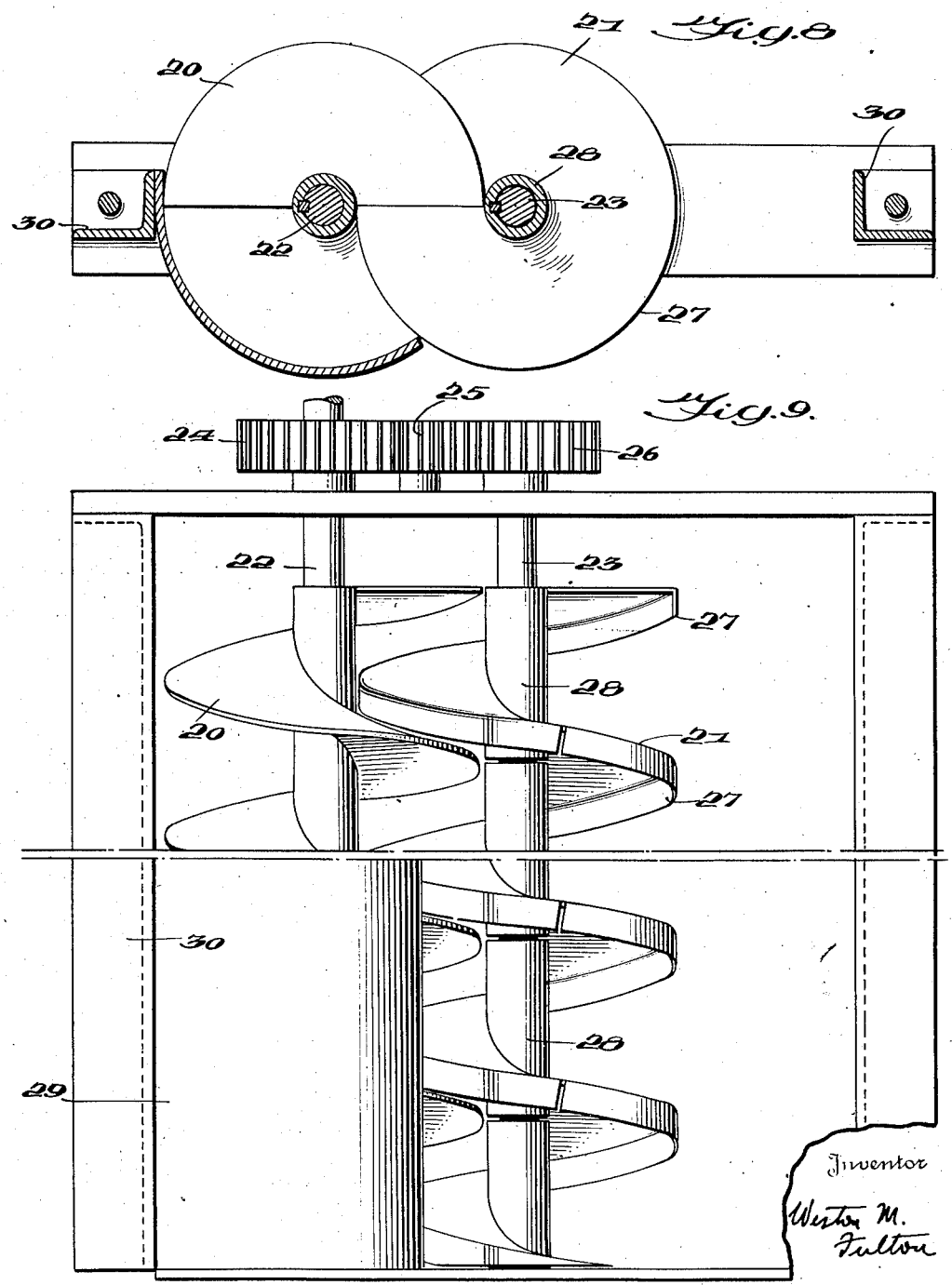

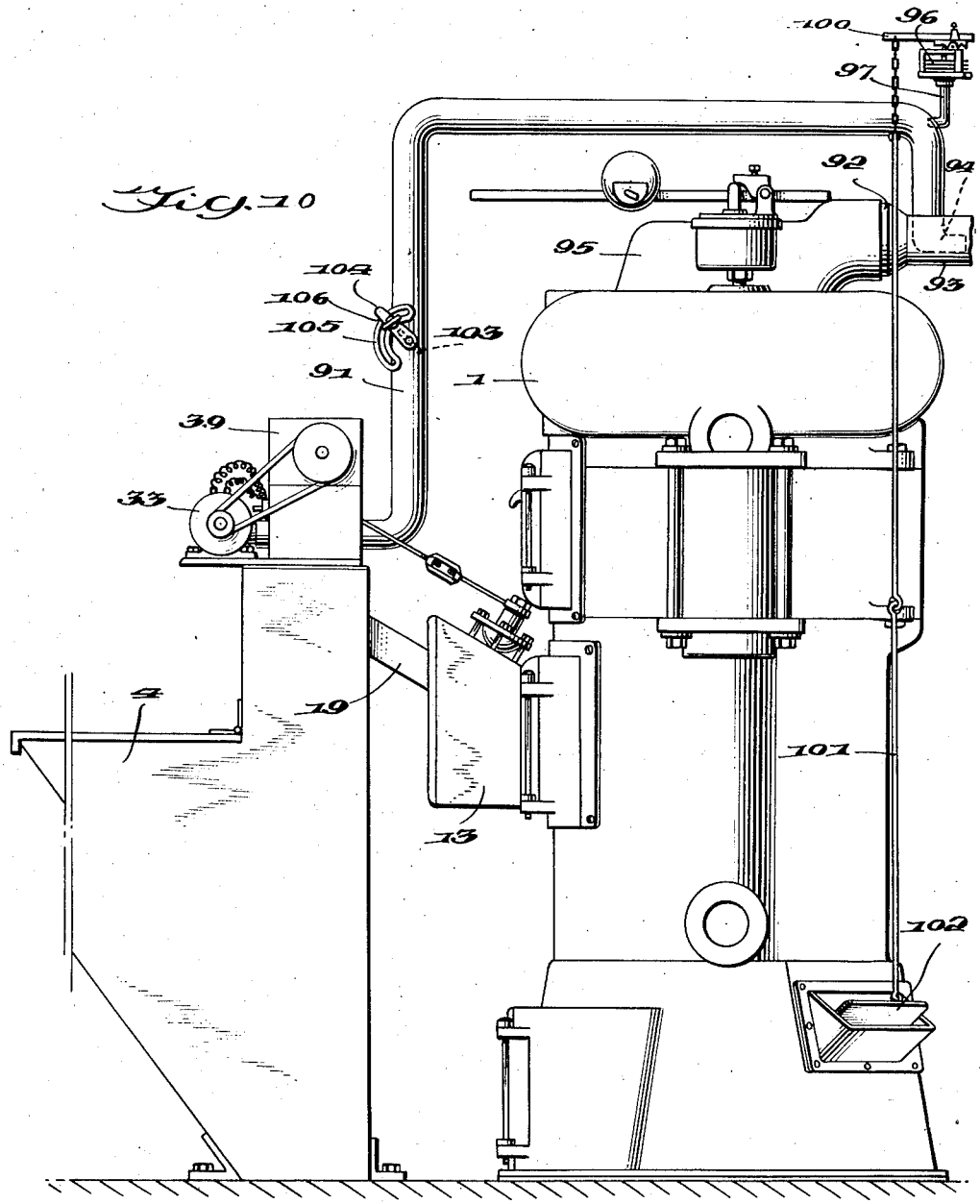

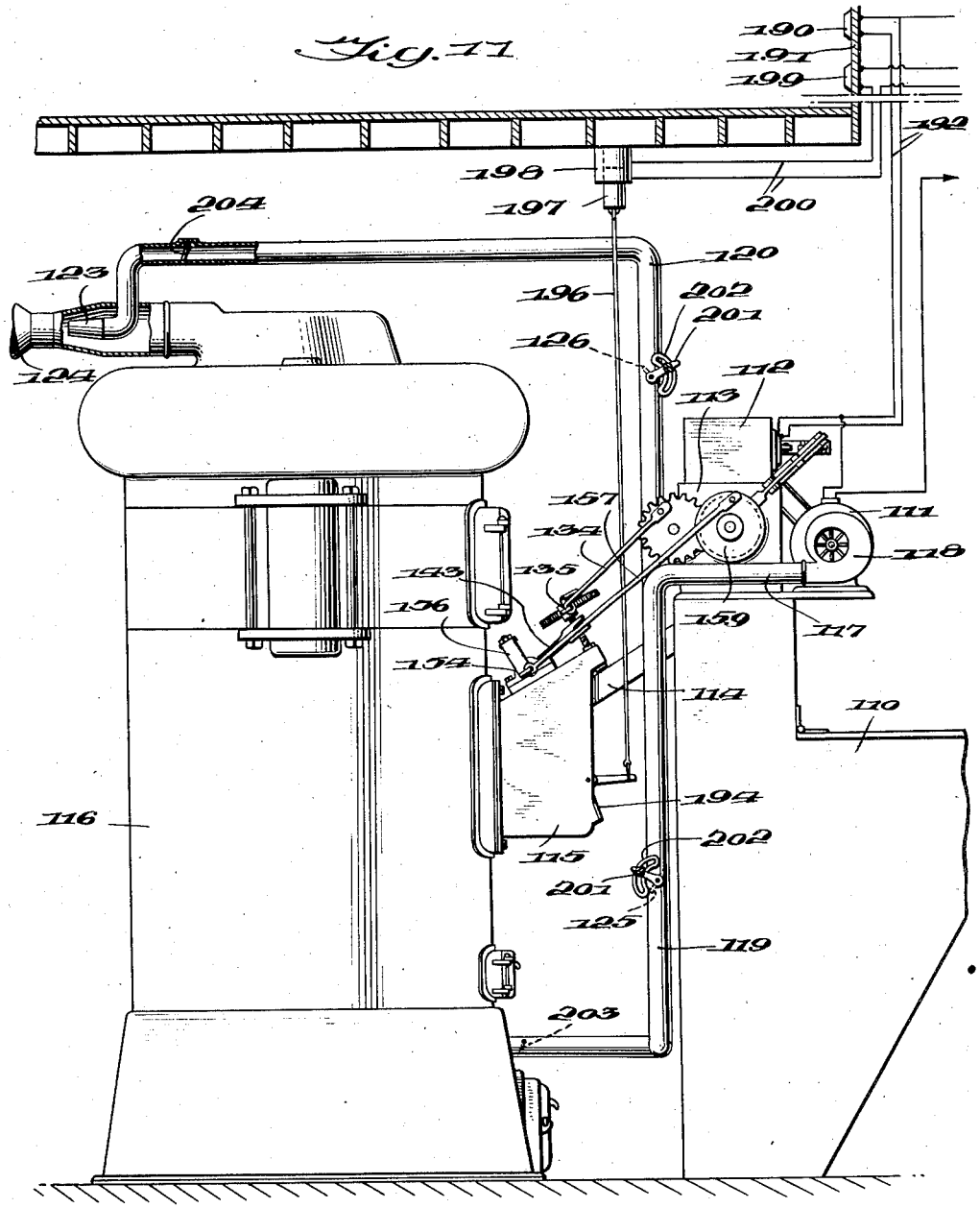

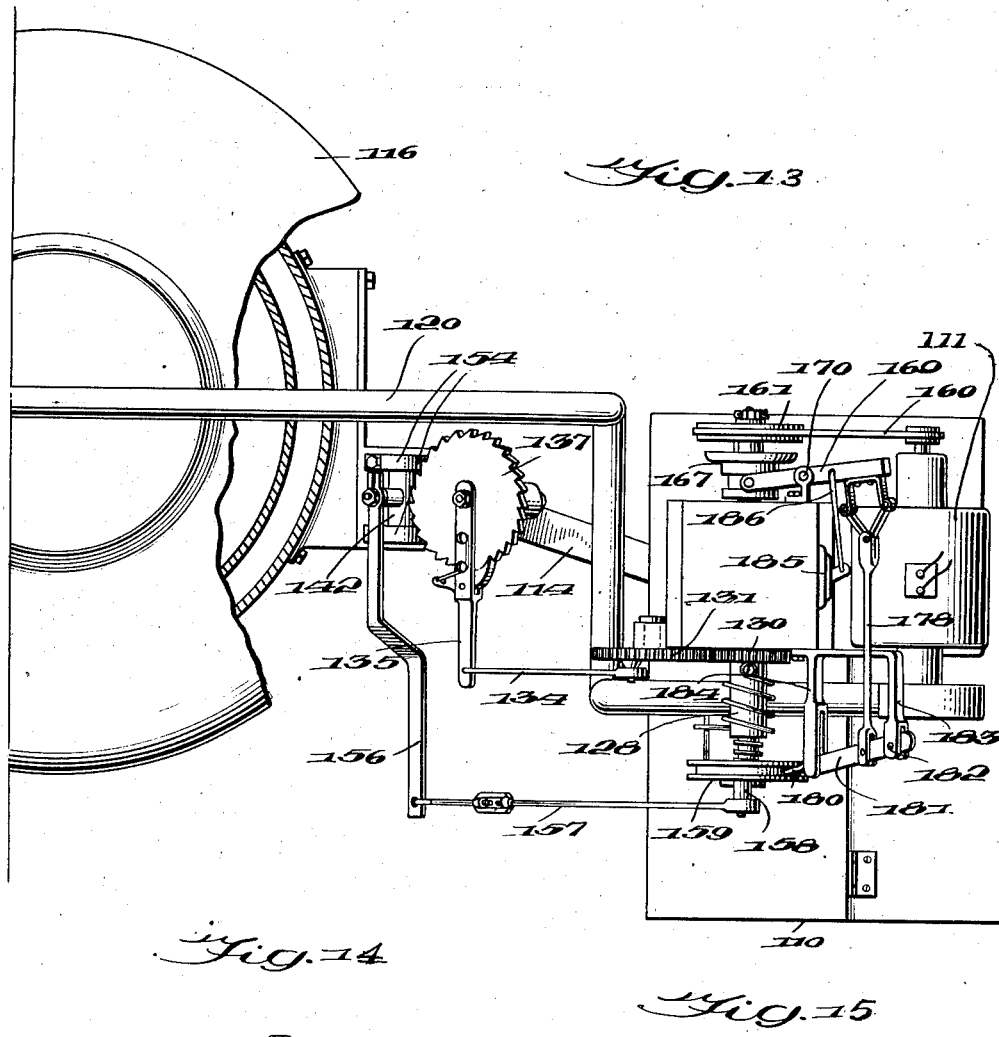
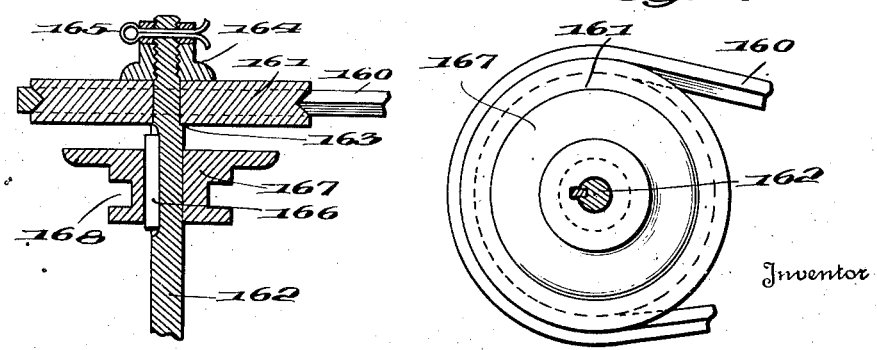

June 12, 1945.  W. M. FULTON  2,377,874
AUTOMATIC STOKER
Filed Aug. 11, 1938     11 Sheets-Sheet 9
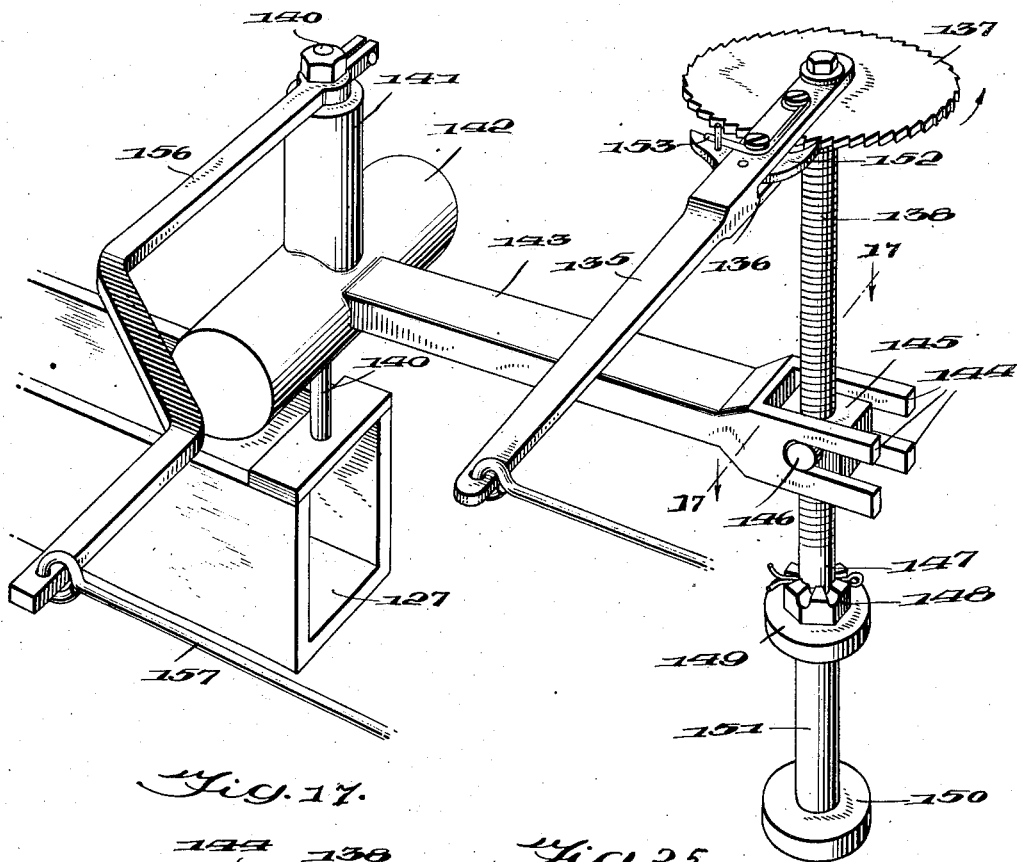
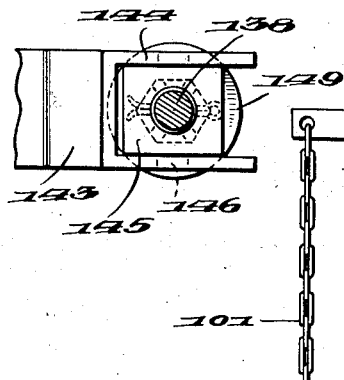
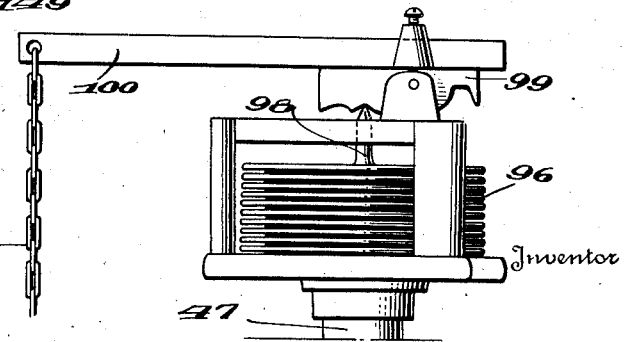
Inventor
Weston M. Fulton
By Cyrus Kehr & Sweeder
his Attorneys

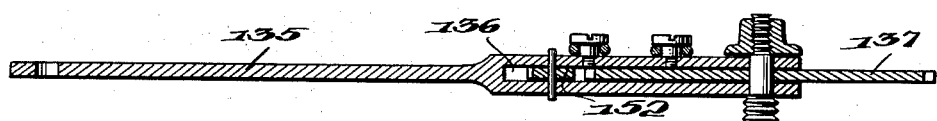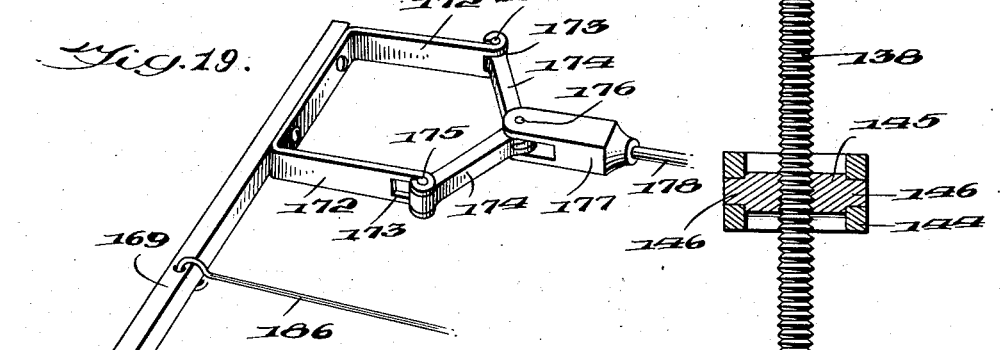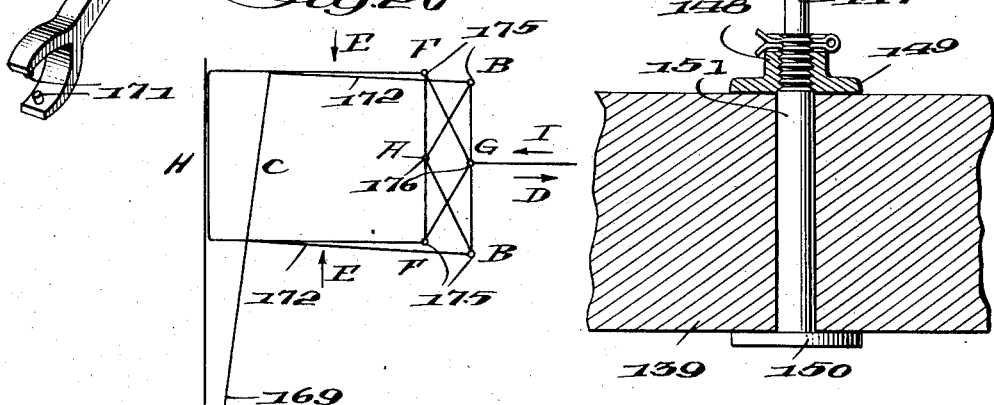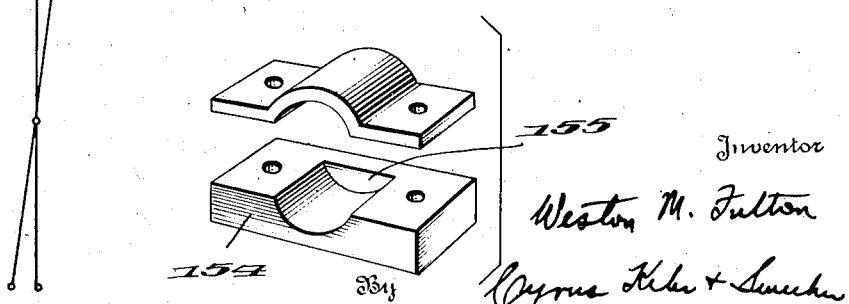

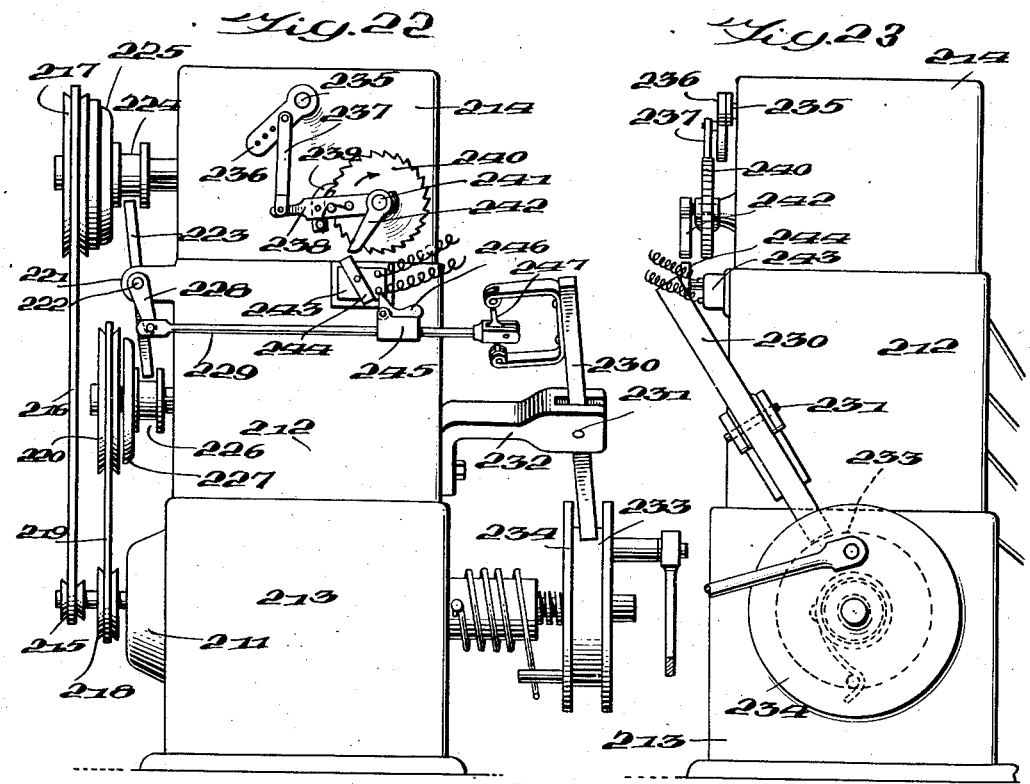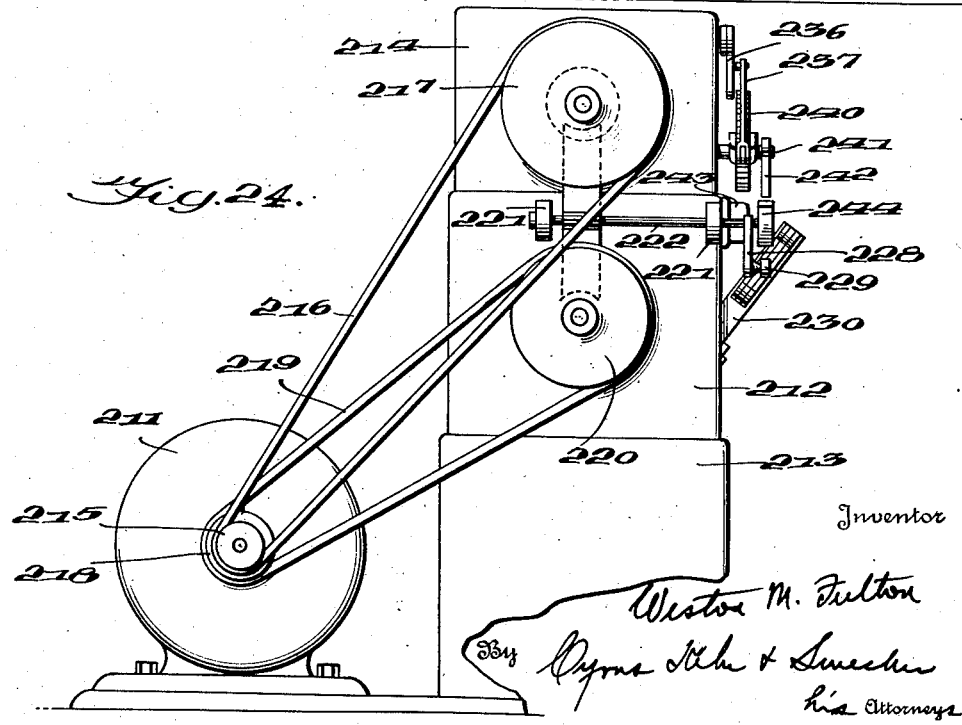

Patented June 12, 1945

2,377,874

UNITED STATES PATENT OFFICE 2,377,874

AUTOMATIC STOKER

Weston M. Fulton, Knoxville, Tenn., assignor to
W. J. Savage Company, Inc., Knoxville, Tenn.,
a corporation of Tennessee Application August 11, 1938, Serial No. 224,394

31 Claims. (Cl. 110—101)

This invention relates to an improvement in stokers for furnaces, and more particularly to stokers of the type known as "domestic stokers," which are required to meet conditions quite different from the type known as "power plant" stokers.

Domestic stokers are used principally on the heating plants of residences, small apartment houses, etc., where the heating load varies with the weather and is subject to very wide extremes. Noise and dust are very objectionable. Domestic stokers are attended usually either by the house owner or a domestic servant, most of whom are not familiar with mechanical structures and therefore neglect the mechanical up-keep of the stoker.

On the other hand, power plant stokers operate under more uniform load conditions; are installed in industrial plants with other noisy machinery where noise is not a factor; and are operated under the care of a skilled power plant engineer. Furthermore, power plant stokers usually are installed at the time that the power plant itself is installed, whereas most domestic stokers are installed on heating plants that have been in service for a period of time which therefore complicates the installment of the domestic stoker. This results from the fact that domestic stokers have only recently been available commercially, prior to which time it was the universal practice to depend upon hand firing of furnaces in residences, small apartment houses, etc.

The usual domestic stoker used commercially is of the underfeed screw type where a feed screw extends horizontally from the bottom of the holder to the underside of a fire bed, in order to convey the fuel thereto, air being supplied to an adjacent air chamber by means of a fan. Stokers of this type possess numerous disadvantages, some of which may be mentioned as follows:

First, in order to install such a stoker on a heater, it is necessary to remove the grate bars, close the access opening to the ash chamber and build an air chamber underneath and around the tuyère blocks and dead plates and provide connections between this air chamber and the fan and feed screw housing. This air chamber must be substantially air-tight and must be made of a heat resisting material, such as fire brick laid in fire clay mortar. These materials are expensive and require expensive skilled labor. Furthermore, all dampers with attached operating mechanisms must be discarded and replaced with expensive electric controls which is an added waste.

Second, if the stoker becomes inoperative through some such cause as prolonged interruption of electric current or breakage of parts, the owner is without heat because the removal of grate bars, dampers, etc., makes hand firing impossible.

Third, if for any reason, such for example, as greatly reduced demand upon the stoker during a short period of warm weather in the heating season, the fire in the stoker burner becomes extinguished when demand is resumed and the automatic electric controls start the stoker, it will proceed to feed fuel into the combustion chamber until the latter is packed full and sometimes this continues until the fire door is forced open and the fuel thrust out onto the furnace room floor. This presents a fire hazard and in any event, the house owner must remove all the fuel from the combustion chamber, replace it in the hopper and start a new fire in the tuyères.

Fourth, the feeding mechanism of such prior domestic stokers cannot handle foreign matter, such as pieces of wood, iron, rock, etc., which often becomes accidentally mixed with the fuel. If a lump of material is caught by the conveyor screw at the point where it enters the housing, this lump must be crushed by the screw before it can be carried into the conveyor housing, in view of the very small dimensions of the space between the screw and housing. To make a screw and housing which can crush such foreign matter and to provide sufficient power for this purpose is impracticable in domestic stokers, and consequently shearing pins, friction devices, or hydraulic drives with pressure limiting devices have been provided heretofore to take care of this emergency. All of such devices are objectionable because they serve merely to render the fuel feeding mechanism temporarily inoperative and thereby interrupt the supply of heat and force the houseowner to take a part or all of the fuel from the hopper in order to remove the obstruction.

Since these safety devices render the feeding mechanism inoperative while permitting the blower to continue its operation, the supply of fuel in the tuyères soon becomes exhausted by combustion and the fire becomes extinguished, thereby making it necessary for the house owner to start a new fire after removing the obstruction to the conveyor screw. Also, the combustion which continues without the addition of fresh fuel, causes the burning zone to extend gradually down into the tuyère box with probability of injury thereto which is one of the causes for frequent replacement of tuyères. In using shearing pins, the house owner must replace the sheared pin with a new one which is objectionable when the owner is not accustomed to it or does not have the proper tools.

Fifth, the only method for removing the ash and clinkers from the combustion chamber is through the fire door of the heater, since the grate bars have been removed and the ash chamber closed and lined; consequently, ashes and clinkers are at a very high temperature when being removed and produce smoke and fumes in the furnace room before they can be removed therefrom, which is objectionable and present an unpleasant task in removing these hot products.

Sixth, due to the wide variations in demand upon the stoker resulting from variations in weather conditions, the thickness of the fire bed in the combustion chamber varies widely. When the stoker is idle, it is necessary to admit a small amount of air into the air chamber, otherwise explosive gases may be distilled off the hot fuel and make possible a dangerous explosion in the furnace, when the stoker is restarted by the automatic control. This small amount of draft passing through the tuyères not only carries away the explosive gases, but it also furnishes a limited supply of oxygen which combines with the fuel and slowly consumes the latter, thereby reducing the thickness of the fuel bed. When the stoker remains idle for a considerable period of time, the thickness of the fire bed is reduced gradually. On the other hand, in severely cold weather when the demand on the stoker is great, the thickness of the fire bed becomes excessive often varying from two inches up to fifteen inches or more. The operation of the stoker blower at constant speed gives a uniform air supply, and it is recognized that under given conditions of air supply, character of fuel, etc., there is one thickness of fire bed at which maximum efficiency of combustion is attained, and above and below this thickness, the efficiency decreases appreciably. Attempts have been made to cure this objection in domestic stokers, but these have not been entirely successful. In this invention, it is recognized that the development of efficient combustion is by establishing the required thickness of fire bed for the conditions under which the heater is to operate, and then to maintain this thickness unchanged.

The primary object of this invention is to improve the construction of a domestic stoker which will overcome the above objections to stokers provided heretofore and which will be more practical and efficient in operation. Such a stoker should be readily adaptable to the various conditions encountered in heating plants that have been in use and to which it may be applied and which will overcome objectionable features in such heating plants and render them more efficient in operation.

Where the heating plant has been in service for several years and has been operated by hand firing, frequently it is inefficient in operation. For instance, in many cases, the heating contractor has either under-estimated the size of the heating load or has selected a heater of insufficient capacity, in order to reduce construction costs. In these cases, the house owner has difficulty in getting sufficient heat during severely cold weather. In other instances, the chimney flue either is too small or of insufficient height, or other objections which cause insufficient draft to maintain proper combustion in the heater which results in underheating in cold weather. In other instances, the heating contractor has over-estimated the heating load and has selected a heater which is too large, producing overheating with a waste of fuel, especially in mild weather.

In carrying out the foregoing objects, the invention may be embodied in different forms, some of which are illustrated in the accompanying drawings, in which:

Fig. 3 is a vertical sectional view through the stoker structure and lower portion of the heater, parts being in elevation;

Fig. 4 is a horizontal sectional view through the gear box of the driving mechanism;

Fig. 5 is a top plan view of the stoker mechanism and heater, shown in Figs. 1 and 3;

Fig. 6 is a partial front elevation of a portion of the boiler with the stoker structure removed therefrom;

Fig. 7 is a top plan view of a portion of the fuel feeding mechanism;

Fig. 8 is a horizontal sectional view therethrough;

Fig. 9 is a front elevation thereof, removed from the hopper;

Fig. 10 is a side elevation of the invention applied to a heater and having an induced chimney draft;

Fig. 11 is a side elevation of a heater showing a further modification of the stoker structure and the application of a thermostatic control thereto;

Fig. 13 is a top plan view thereof, partly in section;

Fig. 14 is a horizontal sectional view through the motor drive for the gear box;

Fig. 15 is a transverse sectional view therethrough;

Fig. 16 is a perspective view of the operating parts of the fuel trough automatic adjusting mechanism, detached;

Fig. 17 is a partial horizontal sectional view therethrough on the line 17—17 of Fig. 16;

Fig. 18 is a vertical sectional view through the operating parts of the fuel trough automatic adjusting mechanism, shown in Fig. 16;

Fig. 19 is a perspective view of the clutch and switch operating mechanism used in connection therewith;

Fig. 20 is a diagrammatic illustration of the operation of said mechanism;

Fig. 21 is a disassembled perspective view of the parts of the journal box thereof;

Fig. 22 is a front elevation of an over-running device to control the operation of the blower;

Fig. 23 is a side elevation thereof from one side;

Fig. 24 is a side elevation thereof from the opposite side; and

Fig. 25 is an enlarged side elevation of the draft regulator used in connection with the installation, shown in Fig. 10.

The invention is shown in connection with a furnace, such as a domestic steam heating boiler, which is designated generally by the numeral 1, and which has the usual fire chamber 2 therein, in which the fuel bed is maintained over the usual grate 3 of the heater.

Figure 1:
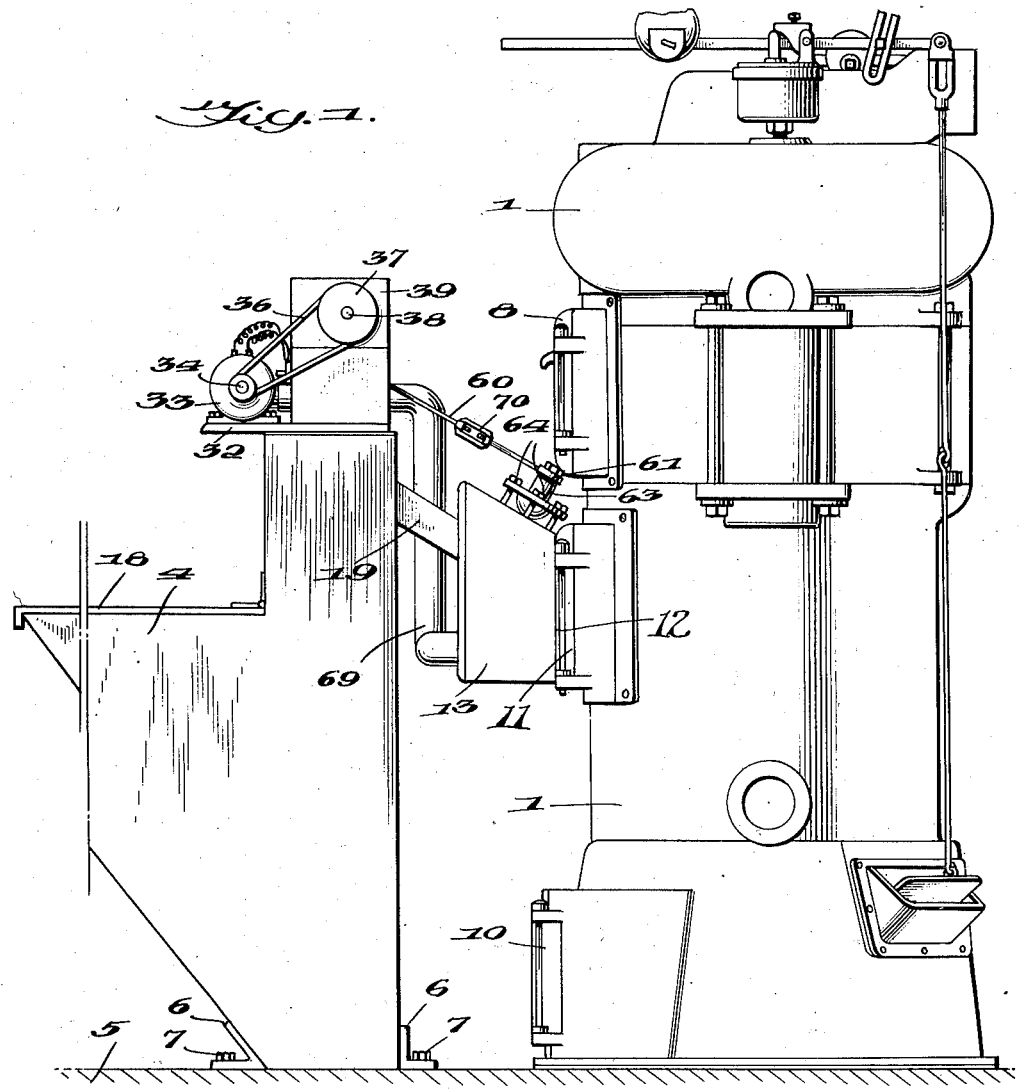
Fig. 1 is a side elevation of one form of the invention applied to a domestic steam heating boiler.

Mounted in front of the heater 1 is a fuel storage hopper 4, which is preferably secured to the floor 5 of the furnace room by lugs 6 and bolts 7, the lugs being securely attached to the base of the hopper 4. As shown in Fig. 5, the hopper is spaced in front of the heater 1, and is also located at one side of the center thereof, this being shown at the left hand side of the front center line of the heater. However, if there should be an obstruction in the boiler room to prevent the location of the hopper on the left hand side, it could be located as readily on the right hand side. The purpose of locating the hopper at one side of the front center line of the heater is to maintain free access to the front of the heater, particularly to the flue door 8, the fire door 9 and the ash chamber door 10, as shown in Fig. 1, which may be opened and closed in the usual manner without interference by the stoker mechanism, and all of the usual operations, such as cleaning the boiler flues, examining the fire in the combustion chamber, and removing ashes from the ash chamber, can be performed without hindrance by the presence of the hopper and other stoker mechanism.

In adapting the heater or furnace to accommodate my improved stoker mechanism, the grate 3 is not disturbed and the only adaptation required in a simple installation is with reference to the fire door. The usual fire door is removed and its frame replaced by a frame 11, shown in Fig. 6, which frame 11 has two separate openings, one of which accommodates a small fire door 12 which is hinged to the frame, while a special fuel and air connection 13 is rigidly secured to the frame 11 beside the door 12, as by bolts, screws, or the like. This connection 13 is provided with a fuel opening 14 therein and with an air opening 15, for the purposes hereinafter described. The other parts of the furnace are not disturbed and function as usual.

The hopper 4 has an upright compartment 16 in the rear portion thereof, toward the rear in which the elevating conveyor for the fuel is located. A partition 17 extends downwardly at one side of the compartment 16 into the hopper, so as to form an opening between the hopper and the compartment which is somewhat reduced in size and through which the fuel flows by gravity but without flooding the compartment and its conveyor when the hopper is full of fuel, thereby insuring a more uniform feeding of fuel. The top of the hopper 4 may be closed by a hinged cover 18, if desired.

Extending laterally from the upper portion of the compartment 16 is a fuel chute 19, that is directed through the fuel opening 14 of the fuel and air connection 13. The upper end of the fuel chute 19 is spaced downwardly from the upper end of the compartment 16, leaving a space thereabove and above the conveying mechanism, so that if the fuel chute 19 should become clogged with fuel, the elevating mechanism will discharge the fuel into this space thereabove and allow it to pass downward beside the same into the lower portion of the compartment 16, thus avoiding the possibility of damage to any of the working parts.

The conveyor mechanism mounted in the compartment 16 to elevate the fuel therein, is shown more clearly in Figs. 3 and 7 to 9, and corresponds substantially with that set forth in my prior patent on Feeder, No. 2,173,414, granted September 19, 1939. This consists of twin intermeshing screws 20 and 21, mounted on shafts 22 and 23, respectively, whereby they are rotated in the same direction. Shaft 22 is the drive shaft for the conveyor and carries spur gear 24, meshing with an idler gear 25, which in turn meshes with a spur gear 26 fixed on shaft 23 to rotate the latter in the same direction and at the same speed of operation as the shaft 22. Both screws 20 and 21 have the same pitch, so that they operate in unison. The blades of screw 20 are of the usual plane construction, while the blades of the screw 21 have a down-turned lip 27 which surrounds the periphery thereof and lies in a plane which extends parallel with the direction of rotation of the screw. The screw 21 is made in sections, each of which constitutes one complete convolution (360°), and each section has a sliding keyed or splined connection on the shaft 23, so as to be rotated by the shaft, but free to slide lengthwise thereof. The hubs 28 of the sections are spaced apart for relative longitudinal adjustment of the sections on the shaft 23. In this way, the lip 27 of screw 21 rests snugly upon the corresponding portion of the blade of screw 20. A curved shield 29 fits snugly about the screw 20, being fastened at one side to frame 30 of the compartment 16, which supports the conveyor mechanism and the opposite edge of the shield 29 engages the lip 27 where the latter ceases to contact the blade of the screw 20.

Screw 21 is open on all sides in the compartment 16, while screw 20 is also open on all sides, except that portion which is enclosed by the curved shield 29. Fuel is taken in at the bottom end of screw 20 and is carried around until it contacts lip 27 of screw 21, where it is completely housed in by the blades of screw 20, the lips 27 of screw 21, and the shield 29, and thus is forced to follow screw 20 upward until it reaches the discharge outlet at the upper end of chute 19, where it is discharged in the chute, thence to the heater.

Mounted on the upper end of conveyor compartment 16 is a gear box 31, having a base 32 rigidly attached to the compartment 16. The base 32 of the gear box extends forwardly beyond the gear box and has an electric motor 33 mounted thereon. The armature shaft 34 of the motor 33 carries a pulley 35 which is connected through a V belt 36, with a pulley 37. The latter is secured to a shaft 38 of a speed reducing unit 39, of any well-known construction. The reduced speed shaft of the unit 39 extends into the gear box 31 and is connected with shaft 22 of screw conveyor 20, which shaft also carries gear 24 that drives the companion screw 21, the gearing being enclosed within the gear box 31, as shown in Fig. 3.

Also mounted on shaft 22 is a bevel pinion 40 which meshes with a bevel pinion 41, secured on a shaft 42 that extends through a side of the gear box 31, as shown in Fig. 4. The inner end portion of the shaft 42 is journaled in a side of the gear box at 43, and externally of this journal, the shaft 42 has an enlarged portion 44 terminating in a threaded reduced portion 45, and a smooth portion 46, the latter portions being of reduced diameter, while the portion 45 has coarse screw-threads of relatively large pitch.

A disc 47 is threaded loosely on the portion 45 and carries a pin 48, projecting inwardly toward the gear box 31. A coiled spring 49 is wound loosely around the enlarged portion 44 of the shaft 42 and has one end attached directly to said shaft at 50, while the opposite end of said spring has hook engagement with the pin 48. Spring 49 is so adjusted as to tend to rotate the disc 47 in a clockwise direction when looking toward the shaft 42 from the outer end thereof, which tends to hold the disc 47 screwed up on the threaded portion 45, against the enlargement.

The disc 47 has an annular groove 51 in its periphery and one end of a walking beam 52 is received loosely in this groove 51, while the other end of the beam 52 is pivotally connected at 53 to a link 54. The beam 52 is pivotally supported at 55 within a bifurcated arm 56, attached to a side of the gear box 31. Link 54 is pivotally connected with a lever 57 which operates an electric snap switch 58, mounted on a side of the gear box 31. This snap switch may be of any well-known construction. It controls the supply of electric current to the electric motor 33.

Figure 2:
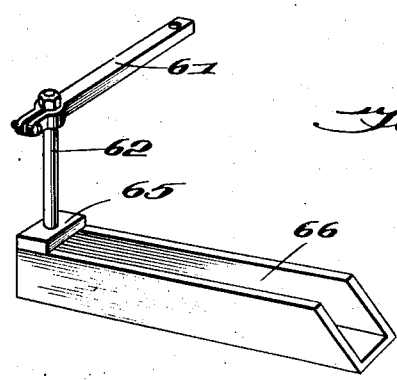
Fig. 2 is a perspective view of the oscillating fuel trough used in connection therewith.

The disc 47 carries a stud 59 screw-threaded into the outer side thereof, and has pivotally mounted thereon an operating link 60 held in place by a cotter pin 61'. Operating link 60 extends to and is pivotally connected with the outer end of a lever 61 rigidly attached to a shaft 62, journaled in a rocking member 63, as shown in Fig. 3. Said rocking member 63 has a ball-faced underside seated upon the connection 13 where it is held in adjusted position by screws 64, but said member 63 is capable of rocking movement relative to the connection upon loosening the screws 64, the latter passing freely through holes in the member sufficiently large to permit such adjustment. The lower end of shaft 62 has a block 65 secured thereto which carries an oscillating fuel trough 66 (Fig. 2). This trough 66 is made of refractory material, so as to withstand the high temperature of the combustion chamber of the heater; an alloy of iron (50%), nickel (35%) and chromium (15%) is suitable for the construction thereof. The upper end of the trough 66 receives the lower end of the fuel chute 19, as shown in Fig. 3, and is capable of oscillatory movement from side to side by the lever 61. It may be adjusted to different vertical positions indicated in dotted lines in Fig. 3 by means of the adjusting screws 64 causing tilting of the rocking member 63, there being sufficient looseness between the chute 19 and the trough 66 for these relative movements. Chute 19 has a check gate 67 therein capable of swinging rearwardly when fuel is passing downwardly through the chute and then swings to a vertical position after the passage of fuel in order to prevent the possibility of smoke or fumes from the fire or fuel chamber from entering the conveyor housing.

As shown in Fig. 5, the blower 68 of any well-known construction is supported by the electric motor 33 with its rotor attached to the armature shaft 34 of the motor and driven thereby. Leading from the blower 68 is an air duct 69 which is connected with the orifice 15 of the connection 13 for supplying air to the combustion chamber 2 of the heater to support combustion therein which air is supplied immediately around and beneath the fresh fuel being fed into the heater and over and above the bed of burning fuel in the combustion chamber, as shown in Fig. 3.

Electric switch 58 is connected to a source of electrical supply and controls the operation of the electric motor 33 through its connection therewith.

The house owner or an engineer should determine what thickness of fuel bed is best suited for the efficient operation of the particular heater to which the stoker is applied, taking then into consideration the character of fuel to be used, the size of boiler, amount of grate area, strength of chimney draft, etc., and then adjust the lower end of the trough 66 to a height above the grates 3, equal to the desired fuel bed thickness. This adjustment is made by adjusting the screws 64 which control the tilting and placement of the fuel trough 66, acting on the rocking support 63. Tilting the trough 66 to its upper dotted line position would necessitate shortening of the operating rod 60 to accommodate therefor, which may be done by adjusting turn-buckle 70, provided therein. To lower the discharge end of the trough 66, the turn-buckle is adjusted to lengthen the operating rod 60. This adjustment may be changed from time to time as changed conditions may require, such as the use of a different kind of fuel.

Fire is now started in the heater in the usual way. If the heater has been operated previously by a natural chimney draft, combustion will proceed in the normal way, since none of the chimney and damper connections are disturbed by the installation of this stoker.

When the hopper 4 is filled with fuel, it is only necessary to start the electric motor to cause it to drive the elevating conveyor 20—21 through the speed reducing unit 39 and the shaft 22. This causes fuel to be elevated along the conveyor 20 to the upper end thereof, where it is discharged into fuel chute 19, thence through trough 66, into the combustion chamber 2 where combustion is taking place. In the meantime, the bevel pinion 40 on shaft 22 drives pinion 41 to rotate shaft 42 and disc 47. This imparts reciprocating motion to the operating rod 60, pivoted on the stud 59, which movement oscillates lever 61 on shaft 62, thereby oscillating trough 66 with its discharge end in a plane parallel with the surface of the grate 3. This motion first spreads the fuel evenly over the fire bed, and, second, as soon as the fuel bed builds up to where the discharge end of the trough 66 contacts it, the frictional resistance thus developed hinders the oscillating movement of the trough and thereby resists the operation of the disc 47, so that it remains stationary, while shaft 42 (Fig. 4) continues to rotate. Due to the screw-threaded connection at 45 between the shaft and disc, the latter is forced outward longitudinally of the shaft, thereby swinging the walking beam 52 which is received at one end in the groove 51 in an outward direction, thus moving link 54 to swing switch lever 57 to an open position, breaking the electric circuit to the motor 33 and discontinuing the feeding of fuel to the heater.

As soon as sufficient fuel is consumed to cause the fire bed to drop slightly below the discharge end of the trough 66, the latter is free again to oscillate. The heavy coiled spring 49 (Fig. 4) acts on pin 48 to rotate the disc 47 to screw it up against the enlargement 44, thereby shifting the switch arm 57 to close the circuit to the electric motor 33 for resuming the feeding operation.

The disc 47 may be provided with several threaded openings 71 into which the stud 59 may be screwed alternately, thereby changing the distance through which the trough 66 may oscillate. The amount of oscillation will depend upon the size of the combustion chamber of the heater. For very small heaters, it may not be necessary to oscillate the trough at all, and in such cases other means may be provided to regulate the thickness of the fire bed as will be described hereinafter.

During the entire time that the motor 33 is operated, the blower 68 will be operating also which will provide fresh air over the top of the fuel bed in the combustion chamber of the heater to burn all the volatile gases being driven off from the green fuel being fed into the heater. As soon as the feeding operation is discontinued, practically all of the volatile matter which would produce smoke has been driven off, as is usually the case, since only small quantities of fuel are fed into the combustion chamber at any one time. In the case of larger installations, where the amount of fuel fed at each interval is excessive an "over-run" mechanism (hereinafter described) will be employed to keep the motor 33 and blower 68 operating during an appreciable length of time after the fuel feeding mechanism has ceased to operate.

A damper 72 should be provided in the air duct 69 of sufficiently light weight material, so as to be opened automatically upon the supply of air therethrough from the blower, but to close against back draft and to prevent smoke or fumes from passing through the air duct from the combustion chamber.

The invention described above utilizes the natural chimney draft, but where the stoker is applied to a heater where the chimney draft is deficient to such an extent that it requires some additional boosting when fresh fuel is being fed to the heater, in order to take care of the temporarily added combustion requirements, an arrangement such as that shown in Fig. 10 may be used. In such an installation, the supplying of air to the combustion chamber by the blower described above may be excessive for the natural draft of the chimney, with the result that there is danger of smoke and fumes being forced out around and through the doors of the heater into the furnace room which is objectionable.

The construction and operation of the stoker mechanism shown in Fig. 10 is the same as that shown in Figs. 1 to 5, except that the air supplied by the blower is directed through a duct 91 to the exhaust smoke pipe 92, which connects the heater 1 to the chimney. Smoke pipe 92 is provided with a short portion 93 having its diameter substantially reduced below that of the rest of the pipe, and the duct 91 enters this reduced portion and terminates in a tapering nozzle 94, thereby forming an ejector which produces suction in the smoke hood 95 of the heater 1, and thus boosts the draft through the combustion chamber of the heater.

In order to insure that ample air shall be admitted beneath the grate of the heater to provide free combustion, a bellows pressure regulator, such as a Sylphon regulator, is shown at 96 and connected through a tube 97 with the air duct 91, so that when the blower is supplying air through the air duct 91, this increase in pressure will expand the Sylphon pressure regulator 96. The structure of this is shown more clearly in Fig. 25. The bellows regulator 96 has a plunger 98 attached thereto which will be pushed upward by the expanding of the bellows, and cause a rocking member 99 to swing lever 100 upwardly. The free end of lever 100 is connected through a flexible device 101, with draft damper 102 of the heater 1. Hence when the lever 100 is forced upward by the expansion of the bellows 96, damper 102 will be opened as shown in Fig. 10, thus admitting air beneath the grates of the heater. As long as the blower continues functioning, furnishing air under pressure through the duct 91, the Sylphon regulator 96 continues to hold the draft damper 102 open, and ejector nozzle 94 will produce a suction in the smoke pipe 92, and the smoke hood 95 of the heater.

As soon as the blower of the stoker ceases to supply air, the weight of the lever 100 and flexible device 101 will cause the Sylphon regulator 96 to contract in length, thereby allowing a downward swinging of lever 100 and flexible device 101, thus closing draft damper 102 and causing a reduced rate of combustion. Although the use of the Sylphon regulator is preferred, I may utilize any other well-known means for controlling the draft damper 102. This arrangement does not interfere with the usual draft damper controls employed on various heaters, such as are operated frequently by thermostatic means and which may continue to operate independently of this damper control. The pressure regulator 96 only holds the damper 102 in open position while fuel is being fed into the heater which feeding operation continues only for very short periods of time, and the added heat produced at these intervals is not sufficient to cause any material change in the temperature of the house. Thus the thermostatic control of the house temperature is not materially affected thereby.

A damper 103 is provided in the air duct 91 for adjusting the amount of air admitted therethrough and thereby regulating the amount of suction produced by the ejector nozzle 94. Damper 103 is of the usual well-known construction and is attached to an adjusting lever 104 operating over a segment 105 and provided with a clamping screw 106, which may be tightened for locking the lever 104 in set positions. By moving the lever 104 to different positions on the segment 105, corresponding movements of the damper 103 may be obtained, and when the desired adjustment has been made, the lever 104 is locked in its set position by locking screw 106, thereby holding the damper in its adjusted position. This arrangement makes it possible to adjust the suction in the flue pipe to meet various conditions of chimney draft deficiency.

Figs. 11 to 21, inclusive, show how this invention is applied to heaters which are too small for the heating load and how I adapt it to thermostatic control which may have been installed in the building prior to the installation of the stoker or installed simultaneously with the stoker or subsequently thereto.

In this form of the invention, the stoker structure utilizes a fuel holder 110, provided with a fuel conveyor similar to that described above in connection with Figs. 1 to 9, driven by an electric motor 111, through a speed reducer 112, and gear box unit 113. The fuel is discharged from the conveyor to a chute 114 through a connection 115 of the heater 116. The air duct 117 is supplied with air from the blower 118, driven by the motor 111, all substantially as described above.

Figure 12:
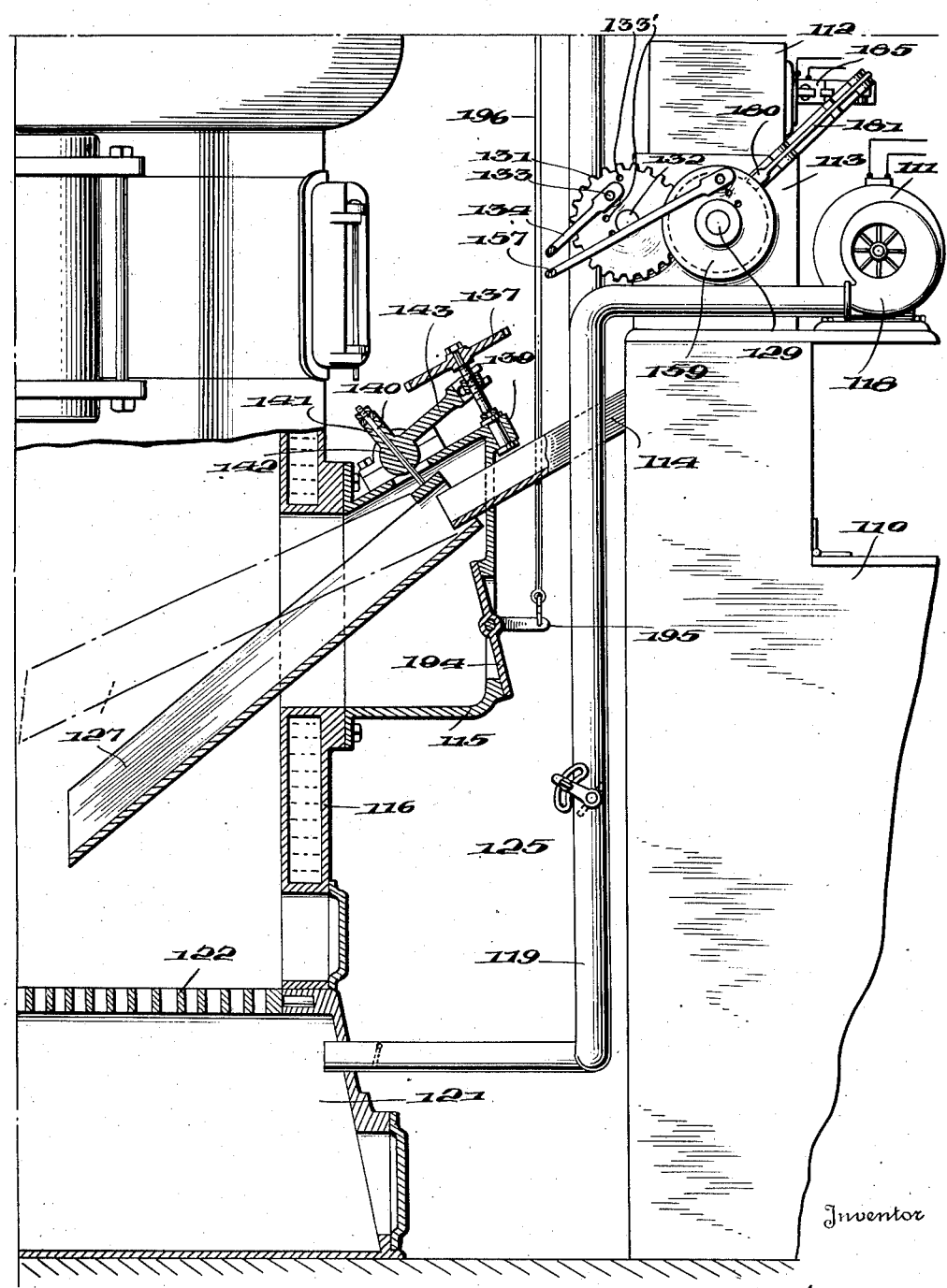
Fig. 12 is a vertical sectional view through this modified form, partly in elevation.

In this form of the invention, the air duct 117 is divided into two branches, 119 and 120. The branch 119 delivers air into the ash chamber 121, as shown in Fig. 12, underneath the grate bars 122 of the heater 116. Branch 120 of the air duct delivers air to an ejector nozzle 123 in smoke pipe 124 in the same way and for the same purpose as described above in connection with Fig. 10. A damper 125 is provided in the duct 119, and a similar damper 126 is provided in the duct 120 for controlling the amount of air passing through these respective ducts. These dampers 125 and 126 are capable of adjustment and locking in set positions in the usual way, as described above in connection with Fig. 10.

The fuel chute 114 has a fuel trough 127, associated with the inner end thereof, within the combustion chamber of the heater which trough is similar to the trough 66, described above in connection with Figs. 1 to 5. However, automatic means are provided in this form of the invention for adjusting the height of the discharge end of the trough. This will enable the house owner to allow the stoker to operate for long periods of time without visiting the furnace room to shake down the ashes. For example, Fig. 12 shows in full lines the proper position of the trough 127 when the ashes have been shaken down into the ash chamber 121 and all clinkers removed, and the grate 122 thoroughly cleaned which will leave a fire bed of proper thickness between the discharge end of the trough 127 and the grate 122. However, the continued operation of the stoker for several days thereafter would cause the ashes and clinkers to accumulate gradually on the grate 122 until they may attain the thickness between the grate and the discharge end of the chute 127 in its full line position.

If no provision were made for adjusting the height of the fuel chute during this period of time, the fire bed would be maintained at the original level and then would consist merely of ashes and clinkers, producing little or no heat. If, however, trough 127 is gradually adjusted to its dotted line position to accommodate for this accumulation of ashes and clinkers, the actual fire bed maintained throughout this interval of time will be of the same thickness as the original fire bed and efficient combustion will be maintained with a consequent added heat supply.

As shown in Fig. 13, the enlarged portion 128 of shaft 129 carries a spur gear 130 which meshes with a spur gear 131, journaled at 132 on a side of the gear box 113. A stud 133 is attached to gear 131, and capable of adjustment of position relative thereto by being engaged in any selected spaced holes 133' therein, as shown in Fig. 12. Journaled on the stud 133 is a reciprocating rod 134, which extends therefrom to a lever 135, shown in Figs. 13, 16 and 18. The lever 135 is bifurcated at 136 and receives therein a ratchet wheel 137, which ratchet wheel is secured upon a screw shaft 138 to rotate therewith. The lower end of screw shaft 138 is journaled in a projecting portion 139 of the connection 115, as shown in Fig. 12.

The trough 127 is supported by a rod 140 rotatably mounted in a projection 141 on a trunnion 142. Projecting approximately at right angles to projection 141 is an arm 143, which is forked at 144 (Fig. 16) and embraces a nut 145 at its extremity. It will be evident from Fig. 16 that arm 143 projects from trunnion 142, approximately at right angles to projection 141 in which the trough oscillating rod 140 is journaled. The forked extremity 144 of arm 143 is formed by four prongs. Trunnion nut 145 is mounted so that its trunnions 146 rotate between opposite forks 144. Screw shaft 138 is threaded through the nut 145, but the threads thereof terminate in an unthreaded portion 147 of reduced diameter, so that when the trunnion nut 145 is screwed downward on the shaft 138, it will reach the smooth portion 147 and thus be arrested in its movement before it strikes the castle nut 148. The castle nut 148 has an enlarged flange 149 seated upon the projection 139 (Fig. 18) and is pinned to the screw shaft 138. The lower end of the screw shaft terminates in a disc 150 with a journal portion 151 between the flange 149 and disc 150 to rotatably support the screw shaft in the projection 139 for free turning movement therein, while holding the screw shaft against longitudinal movement relative thereto.

Fixed on the upper end of screw shaft 138, is the ratchet wheel 137, while the bifurcated portion 136 of lever 135 is pivoted to said shaft coaxially with the ratchet wheel for free oscillation relative thereto without turning the shaft except through the ratchet wheel. Pivoted within the bifurcated portion 136 is a pawl 152, in position to engage the teeth of the ratchet wheel 137, which pawl 152 is spring-pressed at 153 by a spring carried on the bifurcated portion 136.

The opposite ends of trunnion 142 rotate in journal boxes 154 (Fig. 21), mounted on top of special fuel connection 115 as shown in Figs. 11 and 13. Each of these journal boxes 154 consists of upper and lower portions, having closed outer ends shown at 155, which prevent longitudinal movement of the trunnion 144 therein.

As the enlarged portion 128 of the shaft 129 is rotated by the motor 111 and the speed reducer and gear box 112—113, this rotates the gears 130 and 131, imparting reciprocatory motion to the rod 134 to swing lever 135 and pawl 152. The latter turns the ratchet wheel 137 step-by-step in the direction of the arrow in Fig. 16, thereby rotating the screw shaft 138, so as to carry the trunnion nut 145 downward thereon. This movement turns trunnion 142 and tilts the fuel trough 127, raising the discharge end thereof in the combustion chamber of the heater, as shown in Fig. 12. In this way, the trough 127 will be adjusted upwardly gradually as fuel is being fed into the heater and thereby gradually raising the fuel bed. When the ashes are shaken out, lowering the fire bed, the operator releases the pawl 152 from the ratchet wheel and while holding it in released position with one hand, he turns the ratchet wheel with the other hand in a direction opposite to the arrow in Fig. 16, thereby raising the arm 143 until the discharge end of the fuel trough 127 has been lowered to the desired position. Then the pawl 152 is released and reengages the ratchet wheel 137. The mechanism is then ready for automatic operation during another interval of time without the necessity for attention by the house owner.

The fuel trough 127 is oscillated in the same manner described above in connection with Figs. 1 to 5. The rod 140 carries an oscillating lever 156, which is preferably bent downward intermediate its ends to the axis of the trunnion 142, so that its pivotal connection with the connecting rod 157 merely rotates with the trunnion which avoids the necessity for shortening of the connecting rod during the upward turning of the trough. The connecting rod 157 extends to and is pivoted on a stud 158, attached to a disc 159, as explained above.

The object of introducing air underneath the grate of the heater through the duct 119 and to the ejector 123 through the duct 120, is to increase the speed of combustion in the heater enabling it to increase its output and overcome its deficiency due to being too small for the heating load. In installations of this character, it is necessary for combustion to proceed according to the demands of the house being heated and consequently the control of combustion must be independent of the fuel feed control. Stokers provided heretofore do not accomplish this result, inasmuch as their fuel feed mechanism operates only when forced draft combustion is taking place and this is one of the causes for wide fluctuations in the thickness of the fire bed. On the other hand, this invention feeds fuel independently of the forced draft combustion and thereby maintains a uniformly thick fire bed, regardless of the varying demands made upon the heater.

To accomplish this result, the motor 111 is shown in Fig. 13, as driving a belt 160 which passes over a pulley 161 (Fig. 14), journaled loosely on drive shaft 162 of the speed reducing gearing unit 112. The pulley 161 is mounted on the shaft between a shoulder 163 and a castle nut 164 held in place by a pin 165. The shaft 162 has a tightly fitting key 166 therein, which slidably receives the hub of a sliding clutch 167, the face of which is adapted to be shifted into frictional clutch engagement with the adjacent side face of the pulley 161. The clutch member 167 has an annular groove 168 therein, receiving an end of a shifting fork 169, pivoted at 170 to a side of the speed changer unit 112. The character of the shifting fork 169 is shown more clearly in Fig. 19, from which it will be evident that the forked end of said fork is provided with opposed studs 171 which engage in the annular groove 168 of the clutch 167, while permitting free rotation of the clutch member relative thereto. The outer end of the shifting fork 169, has rigidly attached thereto a U-shaped member 172, preferably made of spring steel, so that the arms thereof are yieldable. Each of these arms is bifurcated at its extremity as shown at 173 to receive an end of toggle levers 174 pivoted thereto, the prongs of said arms being curled back upon themselves to retain the pivots 175 of said toggle levers. These arms 172 have a tendency to press inward on the pivoted outer ends of the toggle levers 174 in the direction of the opposed arrows in Fig. 20. The toggles 174 are pivoted together at 176 and also to a head 177 on a rod 178.

Referring to Figs. 11 to 13, wheel 159 receives in the peripheral groove thereof the flattened end 180 of lever 181, which lever is pivoted at 182 to a bracket 183, attached to the side of the gear box 113. Bracket 183 has a second arm 184 which is bifurcated for driving the swinging movement of the lever 181 in response to the axial movements of the disc 159. Near its middle portion, lever 181 is pivotally connected to the adjacent end of rod 178. Electric snap switch 185 is mounted on the side of the speed reducer 112, and has its switch arm connected with the shifting fork 169 through a link 186.

Fig. 11 shows the method of connecting this stoker mechanism with automatic thermostatic controls and electric thermostat 190 is mounted on the wall 191 of the room and is supplied with current in the usual way, being connected through wires 192 with the electric switch 185 and motor 111. If the snap switch 185 is open, so that no current can pass through said switch to the motor 111, and the thermostat 190 is closed, current will be supplied directly through the wires to the electric motor 111, thus causing said motor to operate to drive the blower 118, which latter will supply air to the ducts 119 and 120, and cause rapid combustion to take place in the heater 116, and thus furnish heat to the house including the room containing the thermostat 190. When the temperature there rises sufficiently to open the electric connection and break the circuit to the motor, the latter is stopped.

In the meantime, the wheel 159 has been forced outward because of the rise in the fuel lever preventing oscillation of the fuel trough 127 and the lever 156; whereby the end 180 of lever 181 has been carried outward by the wheel 159, which has drawn rod 178 downward, as viewed in Fig. 13, thereby causing the toggles 174 to force the adjacent end of the shifting fork 169 upward and the forked end thereof downward, thus disengaging the clutch 167 from the pulley 161 and allowing said pulley to run idly on the shaft 162 without driving the fuel feeding mechanism but continuing to drive the blower 118. When the fuel level drops sufficiently in the combustion chamber of the heater to release the fuel trough and allow the lever 156 to move and the rod 157 to reciprocate, the wheel 159 will be forced inwardly by its spring and screw threaded connection carrying with it the end 180 of lever 181, thus forcing rod 178 upwardly in Fig. 13, until the toggles 174 pass their "dead center" position and suddenly draw the shifting fork 169 downward with the opposite end upwardly, thus forcing the friction clutch 167 into frictional clutch engagement with pulley 161, rotating the shaft 162. Simultaneously, the link 186 will be forced downward, thereby closing switch 185, so as to cause electric current to pass therethrough, as will be apparent from Fig. 11. Since the thermostat 190 is open the current will pass to the snap switch 185 without going through the thermostat, thence through the electric motor 111, energizing the latter to drive the fuel feeding mechanism for bringing the fuel level up to the desired point. When this point is reached, it will be evident that the wheel 159 will be forced outward on its shaft and act through lever 181 and rod 178, to disengage the clutch 167 and simultaneously open the switch 185 through the link 186.

The action of the toggles is shown diagrammatically in Fig. 20. When the pivot 176 of the toggles 174 is at the position A, and the pivots 175 are at the points B, then the lever 169 will be in the position C. However, if the pivot 176 be forced in the direction of the arrow D, until it passes slightly beyond the dead center position, the spring arms 172 by pressing against the toggles 174, in the directions of the arrows E, cause the pivots 175 to snap back to the positions F, thereby bringing the pivot 176 to the positions G, and the shifting fork 169 to the position H. If rod 178 should be forced down in the direction of the arrow I, until it passes slightly beyond its center position, the reverse operation will take place and the shifting fork 169 will be moved again to the position C.

In some instances, it has been found that when forced draft is applied to a heater which heretofore failed to produce sufficient heat in severely cold weather, due to its being too small, there is a tendency for the heater to overheat the house in mild weather, even when the forced draft has been shut off by the thermostat. This is due to the fact that forced draft builds up a very hot fire in the heater when the blower is in operation, so that when the latter is cut-off by the thermostat, there is so much latent heat in the incandescent fuel that the building continues to heat up for a period of time after the draft is discontinued.

To relieve this condition, I provide a damper 194 located in the fuel admission compartment 115, and hinged thereto in position to control the supply of fresh outside air to said compartment. Damper 194 has an arm 195 attached thereto which is connected through a cable 196 (Fig. 11), with the core 197 of a solenoid 198 the latter being attached to the ceiling of the furnace room. A second thermostat 199 is located on the wall 191 of the room and is connected through wires 200 with the solenoid 198, current being supplied through the thermostat to the solenoid. Thermostat 199 is set to operate at a slightly higher temperature than thermostat 190, as for instance, one degree higher. Thus, when the temperature of the room operates thermostat 190, to cut-off the forced draft and stop the operation of the stoker, the thermostat 199 will not be closed until the temperature in the room has increased to its set point when it will close the circuit to energize the solenoid 198, and thereby pull upward on the cable 196 and open the damper 194. This admits cold air from the furnace room into the combustion chamber of the heater over the top of the burning fuel and acts as a check damper to reduce the combustion, while at the same time cooling off the passages of the heater. As soon as the temperature of the room falls below the set position of the thermostat 199, the solenoid 198 is deenergized, closing the damper 194. When the room cools still more, the thermostat 190 will start the forced draft and operation of the stoker to prevent further cooling.

It will be noted that by means of dampers 125 and 126 in air ducts 119 and 120, in Fig. 11, I am enabled to adjust readily the supply of air admitted underneath the fire bed and which is furnished to the ejector 123. The object of this arrangement is to produce sufficient suction in smoke pipe 124 to take care of the extra air drawn in beneath the fuel and thereby prevent the possibility of smoke being blown around out of the doors of the heater into the furnace room. The requirements of different installations will vary. Where the chimney draft is very strong, damper 126 in duct 120 may be closed tight, and damper 125 can be opened wide. In other installations where the chimney draft is quite deficient, damper 125 in duct 119 will be closed tight, while damper 126 in duct 120 will be opened wide. Various installations will require adjustments to different positions between these two extremes. In order to adjust each of these dampers, a thumb screw adjustment 201 is connected therewith cooperating with a segment 202, similar to the form of adjustment shown in Fig. 14, and described above. This provides for locking the damper in its desired set position. In order to preclude the possibility of smoke entering either of the ducts 119 or 120, when the blower is not in operation, swing dampers 203 and 204 are provided in the respective ducts, as shown in Fig. 11, each swing damper being pivoted for swinging movement in response to the draft through its duct, being opened by forward movement therethrough and closing against back draft. Each of the swing dampers 203 and 204 is made preferably of light weight material, such as thin sheet aluminum, which is forced into open position by the air pressure when the blower is operating, and will drop by gravity to its closed position, as shown in Fig. 11, when the blower is not in operation, and the relatively feeble chimney draft is not sufficient to force these dampers open, but they close the duct against back draft and the passage of smoke therethrough.

It will be observed from the above description, that this stoker is readily adaptable to a wide variety of conditions, and means is provided whereby the fuel feed operates independently of the thermostatic control of the house temperature, this being a substantial improvement over stokers produced heretofore.

As mentioned above, in installations where the amount of fuel required to be fed at each interval is sufficient to require somewhat prolonged air supply over the fuel bed, an overrun device may be employed to keep the blower operating for a short period of time after the feed mechanism is discontinued automatically. Such an overrun device is shown in Figs. 22 to 24 of the drawings, which may be used for this purpose.

In the mechanism shown in Figs. 22 to 24, the relation of the motor 211, the speed reducer 212, and the gear box unit 213 are similar to the corresponding parts 111—113 of Fig. 11. However, an extra speed reducer 214 is driven from an extra pulley 215 on the armature shaft of motor 211 by means of a V belt 216, which drives pulley 217 of speed reducer 214. Speed reducer 212 is driven from a pulley 218 on the armature shaft of the motor 211, through a V belt 219, to a pulley 220. The construction and operation of gear box 213 and speed reducer 212, are substantially the same as described above in connection with Figs. 1 to 5.

Mounted on a side of speed reducer 212 are lugs 221, shown in Figs. 22 and 24, in which lugs is journaled a shaft 222. A flat bar 223 is fixed to shaft 222, intermediate its ends, and said bar has its upper end engaged in an annular slot 224 of a clutch 225, while its lower end engages in a groove 226 of a clutch 227. The outer end of shaft 222 has a lever arm 228 fixed thereto. An operating rod 229 connects the end of lever arm 228 with a toggle actuating lever 230, which is pivoted at 231 within a bracket 232, secured to a side of speed reducer 212. The lower end of lever 230 is engaged in an annular groove 233 of a disc 234 which is similar in operation and structure to the corresponding discs 47 and 159, described above.

Speed reducer 214 has a reduced-speed shaft 235, which has attached thereto, a lever arm 236, to which is pivoted the upper end of a connecting bar 237, the lower end of which bar is pivoted to a lever 238 carrying a pawl 239, which actuates a ratchet wheel 240 to rotate it in the direction shown by the arrow in Fig. 22, about its pivot 241. Rotatable with pivot 241 and ratchet wheel 240 secured thereto is a trip arm 242 that turns with said ratchet wheel. Electric snap switch 243 is attached to a side of speed reducer 212 and is operated by lever 244 (Fig. 22). A block 245 is attached to the operating rod 229 and carries a pawl 246, pivoted to the block 245, so that when the rod 229 is moved to the left (Fig. 22), the pawl 246 will engage the lever 244 and close the electrical connection in the switch 243, but, when the rod 229 is moved to the right in Fig. 22, the pawl 246 tilts on its pivot on the block 245 and slides beneath the switch lever 244.

The construction of clutches 225 and 227 is substantially the same as shown in connection with Figs. 13, 14 and 15, described above. The construction of lever 238 and ratchet wheel 240 is substantially the same as set forth above in Fig. 16, and described in connection therewith. Operating rod 229 is connected with lever 230 through toggle mechanism designated generally by the numeral 247, which is similar to that set forth in Figs. 19 and 20, and described above.

The construction and operation of the other parts of the mechanism shown in Figs. 22 to 24, are substantially the same as is true of the corresponding parts in the mechanism described above. The electrical motor 211 has an electrical connection with the switch 243 and the latter is supplied with electric current from any convenient source. The blower referred to above, is intended to be attached to the electric motor 211, but is omitted from Figs. 22 to 24, for convenience of illustration, and to avoid unnecessary repetition.

Lever arm 236 is provided with a series of openings or other adjustable means whereby the bar 237 may be connected with said lever arm at varying distances from the pivot shaft 235, so as to increase or decrease the distance through which the connecting bar 237 may travel and thus varying the frequency of operation and thereby the speed at which the ratchet wheel 240 is rotated.

The operation of this mechanism will now be described. When the motor 211 is operated, the switch arm 244 will have been turned to its opposite position from that shown in Fig. 22, thus energizing the electric motor 211. This will have caused the fuel feed mechanism to operate sufficiently so as to cause the disc 234 to move to the right, as shown in Fig. 22, thus tilting lever 230 so that toggle mechanism 247 has pulled operating rod 229 to the right, thereby rotating bar 222, so as to throw clutch 225 into engagement with pulley 217, while disengaging clutch 227 from pulley 220. This causes pulley 220 to rotate idle, and consequently no coal or fuel is being fed to the heater, but the motor 211 continues to operate and to supply air to the heater, and simultaneously, pulley 217 drives the speed reducer 214, causing lever arm 236 to operate the ratchet wheel 240 and the trip lever 242 in the direction of the arrow in Fig. 22, until said trip lever makes one complete revolution, whereupon it engages the switch lever 244 and moves it to the position shown in Fig. 22. This breaks the electric circuit through the switch 243 to the electric motor 211, deenergizing the latter. Thus, it will be noted that after the fuel feed control has ceased to operate, and the clutch 227 is disengaged from the pulley 220, the motor continues to operate and to supply air to the heater, until the ratchet wheel 240 and trip lever 242 have made one complete revolution, being driven by the motor 211 through the pulley 217 which is thrown into engagement with the clutch 225, at the instant that the pulley 220 is thrown out of engagement with clutch 227. The length of time during which air is thus supplied, after the feeding of fuel stops, can be varied by adjusting the point of connection between connecting bar 237 and the lever arm 236.

When combustion in the heater causes the fuel bed to drop sufficiently to throw the fuel lever control back into action, disc 234 will be carried to the left, as shown in Fig. 22, thereby tilting lever 230 so as to cause toggle mechanism 247 to thrust operating rod 229 to the left in Fig. 22, and thereby disengage the clutch 225 from the pulley 217, and simultaneously bring the clutch 227 into engagement with the pulley 220. At this instant, connecting rod 229 carries block 245 and its pawl 246 to the left, so that said pawl engages the switch arm 244, which is then in the position shown in Fig. 22, and moves it to its opposite position where it is turned at an acute angle to that shown in Fig. 22, which closes the electric circuit through the switch 243 to the electric motor 211, energizing the latter and starting the operation.

I have shown and described the use of an air ejector to produce induced draft in the heater, because this is peculiarly adaptable to domestic stokers, especially where installed on an old heating system, and results in a saving of cost. However, if desired, any other method of producing an induced draft may be used, such for instance as the well-known exhaust fan.

This invention provides a stoker mechanism which will not interfere with the operation of any automatic control device which may be in use on the heating system at the time the stoker is installed, so this can continue in use, and will not be affected thereby. If it is desired, at the time this stoker is installed or at any time subsequent thereto, the house owner or heating engineer may install any additional controls without altering the function of the stoker mechanism.

While this invention is illustrated and described in connection with a steam heating boiler, it will be understood that it may be used in like manner in connection with a hot water heating boiler or hot air furnace, or any other type of heater where solid fuel is desired to generate the heat.

It will be noted also that the installation of this stoker requires no changes in the existing heating plant other than a minor change in the fire door of the heater. It is not necessary to discard and waste the clinker door, the ash chamber door, and the grate of the heater, nor to construct additional expensive air chambers, nor to discard existing controls or expensive electric controls located within the building being heated. Furthermore, at any time that the stoker may become inoperative, through some such unavoidable cause as prolonged interruption of electric current, the heater can be fired by hand in the usual way without any hindrance whatever, without impairing the heating efficiency. A uniform thickness of fire bed is maintained at all times, so that maximum combustion efficiency is maintained. No shearing pins or other safety devices are required on the feeding mechanism, since it is an open feeder and will handle all materials of sizes within the range of fuel sizes, regardless of the nature of the material. Ashes shaken down into the ash chamber in the usual way can be allowed to cool before being removed, thereby eliminating smoke, fumes and dust produced by handling this refuse material at high temperatures.

I claim:

1. In an automatic fuel stoking mechanism for a heater, the combination of fuel feeding means, a fuel feeding device arranged to receive fuel from said feeding means and constructed for delivering fuel therefrom to a fuel bed in the heater, said device being disposed in position for contact with said fuel bed, means for moving said feeding device across the fuel bed in contact therewith, and means for operatively connecting said feeding device with the fuel feeding means and constructed for controlling the feeding of fuel thereby in response to the obstruction by the height of the fuel bed in the heater to the movement of said device across the fuel bed, whereby said feeding device delivers and spreads the fuel bed and automatically controls the quantity of fuel fed to the heater.

2. In an automatic fuel stoking mechanism, the combination of a heater having a combustion chamber adapted to contain a fuel bed therein, fuel feeding means, a fuel feeding member arranged in the combustion chamber in position for contact with the fuel bed, said feeding member being constructed for receiving fuel from the fuel feeding means and for delivering the same to the fuel bed, mechanical means for moving said member across the fuel bed in contact therewith, and means for operatively connecting said feeding member with the fuel feeding means and constructed for controlling the feeding of fuel thereby in response to the obstruction by the height of the fuel bed in the heater to the movement of said device across the fuel bed, whereby said member serves the three-fold function of delivering the fuel, spreading the fuel, and automatically controlling the quantity of fuel fed to the heater.

3. In a device of the character described, the combination with a heater having a combustion chamber adapted to contain a fuel bed therein, of means for feeding solid fuel to said combustion chamber, a device in the combustion chamber in position to bear upon the top portion of the fuel bed therein and mounted for transverse oscillatory movement back and forth relative thereto substantially in a horizontal direction, and means operative in response to the obstruction by the fuel bed to the transverse movement of said device for controlling the fuel feeding means.

4. In an automatic fuel stoking mechanism, the combination of a heater having a combustion chamber adapted to contain a fuel bed therein, means for feeding solid fuel to said combustion chamber, an oscillatory member mounted in the combustion chamber and extending transversely from a side thereof in position to engage the top surface of the fuel bed therein and mounted for oscillatory movement back and forth over the fuel bed to scrape and level the same, and means for controlling the feeding of fuel automatically in response to the obstruction by the fuel bed to the lateral movement of said member.

5. In an automatic fuel stoking mechanism, the combination of a heater having a combustion chamber having a bottom means for feeding solid fuel to said combustion chamber at a point spaced above the bottom thereof to provide a fuel bed therein beneath said feeding means an oscillatory member mounted in said combustion chamber over said fuel bed in position to be engaged by the fuel thereof, means for oscillating said member approximately in a horizontal direction, and means for controlling the supply of solid fuel to the combustion chamber by the resistance of the fuel in the fuel bed to the oscillatory movement of said member.

6. In a device of the character described, the combination with a heater having a combustion chamber adapted to contain a fuel bed therein, of means for feeding solid fuel to said combustion chamber at a point spaced above the bottom thereof, a member extending transversely from a side wall of said chamber in position to bear upon the top portion of the fuel bed therein and mounted for transverse oscillatory movement back and forth relative thereto, means for imparting oscillatory movement to said member, and means responsive to the obstruction by the fuel bed to the transverse movement of said member for controlling the fuel feeding means.

7. In an automatic stoking device, the combination of fuel feeding means having a fuel delivery chute, said chute having a member connected therewith for oscillatory movement relative thereto, means for oscillating said member approximately in a horizontal plane to distribute the fuel over a fuel bed, and means connected with said member for discontinuing the feeding of fuel when the fuel level reaches said oscillating member and obstructs its lateral horizontal movement.

8. In an automatic stoking device, the combination of fuel feeding means having a fuel delivery chute, said chute having a trough connected therewith and mounted for oscillatory movement means for oscillating said trough approximately in a horizontal plane to distribute the fuel over a fuel bed, and means connected with said chute for discontinuing the feeding of fuel when the fuel level reaches said oscillating chute and obstructs its lateral horizontal movement.

9. In an automatic stoking device, the combination of fuel feeding means having a fuel delivery chute, said chute having a portion thereof mounted for oscillatory movement, means for oscillating said portion of the chute approximately in a horizontal plane to distribute the fuel over a fuel bed, and means connected with said oscillatory portion of the chute for automatically discontinuing the feeding of fuel when the fuel level reaches said chute and obstructs its lateral horizontal movement.

10. In an automatic stoking device, the combination of a heater having a combustion chamber adapted to contain a fuel bed, means for feeding fuel into said combustion chamber including a fuel delivery chute, said chute having a distributing member connected therewith and mounted for oscillation, means for moving said member approximately in a horizontal direction to distribute the fuel over the fuel bed of the heater, and means for automatically stopping the fuel feeding action when the fuel bed reaches said member and obstructs its lateral horizontal movement.

11. In an automatic stoking device, the combination of a heater having a combustion chamber adapted to contain a fuel bed therein, means for feeding solid fuel into said combustion chamber including fuel feeding means, a chute receiving the fuel therefrom and a trough forming a continuation of said chute and receiving the fuel therefrom for directing the same into said combustion chamber, means for oscillating said trough approximately in a horizontal direction, and means operatively connected with said trough for discontinuing the operation of the fuel feeding means when the fuel level rises to the discharge end of said trough and obstructs its lateral horizontal movements.

12. In an automatic stoking device, the combination of a heater having a combustion chamber, means for feeding solid fuel into said combustion chamber including a chute and a trough connected with said chute for directing the fuel therefrom into the combustion chamber, means mounting said trough for oscillatory movement transversely of the length thereof, means for adjusting said trough to different vertical positions, and means responsive to the action of the height of the fuel in the combustion chamber on the oscillatory movement of said trough for controlling the feeding of fuel into the combustion chamber.

13. In a fuel stoking device, the combination of a heater having a combustion chamber, means for feeding solid fuel into said combustion chamber including fuel feeding means, a chute for directing the fuel from said fuel feeding means, a trough operatively connected with said chute and forming a continuation thereof for directing the fuel from the chute into the combustion chamber, means mounting said trough for oscillatory movement approximately in a horizontal direction, said mounting means including means for tilting said trough to different vertical positions relative to the combustion chamber, and means controlled by the action of the height of the fuel in the combustion chamber on the oscillatory movement of the trough for regulating the supply of fuel to the combustion chamber.

14. In an automatic stoking device, the combination of a heater having a combustion chamber adapted to contain a fuel bed, means for feeding fuel to said combustion chamber including a fuel delivery chute, said chute having a conveyor section thereof mounted for oscillation transversely of the combustion chamber over the fuel bed, means for oscillating said conveyor section continuously during the operation of the fuel feeding means to distribute the fuel over the fuel bed, and means for automatically stopping the fuel feeding means when the fuel bed rises to a predetermined extent.

15. In an automatic stoking device, the combination of a heater having a combustion chamber adapted to contain a fuel bed, means for feeding fuel to said combustion chamber including a fuel delivery chute, said chute having a conveyor section thereof mounted for oscillation transversely of the combustion chamber over the fuel bed, means for oscillating said conveyor section continuously during the operation of the fuel feeding means to distribute the fuel over the fuel bed, and means connected with the oscillating means for automatically stopping the fuel feeding means when the fuel bed rises to said oscillating conveyor section.

16. In an automatic fuel stoking device, the combination of a heater having a combustion chamber, an attachment on said heater, means for feeding fuel into the combustion chamber of the heater, said feeding means including a trough extending into the combustion chamber for directing the fuel thereto, a rocking support on the attachment, an upwardly extending journal mounted on said rocking support and carrying the trough for movement about the axis of said journal, said rocking support being constructed for rocking movement of the trough with the rocking support in a plane extending lengthwise of said trough.

17. In an automatic fuel stoking device, the combination of a heater having a combustion chamber, an attachment on said heater, means for feeding fuel into the combustion chamber of the heater through said attachment, said feeding means including a trough extending through the attachment into the combustion chamber for directing the fuel thereto, a rocking support on the attachment, an upwardly extending shaft mounted in said rocking support and carrying the trough thereon for oscillatory movement about the axis of said shaft and also for rocking movement on the attachment, said shaft having a laterally extending arm connected therewith, and means operatively connected with said arm for controlling the supply of fuel to the combustion chamber in response to the resistance by the fuel in the combustion chamber to the oscillatory movement of said trough.

18. In an automatic stoking mechanism, the combination of a heater having a combustion chamber, means for feeding fuel to the combustion chamber of the heater, means for controlling the level of the fuel in said combustion chamber, and means for adjusting said level controlling means to progressively higher levels as combustion proceeds over a prolonged period of time.

19. In an automatic stoking mechanism, the combination of a heater having a combustion chamber, means for feeding solid fuel into the combustion chamber, means for automatically controlling the level of fuel in said combustion chamber, and means for automatically and gradually adjusting said level controlling means to progressively higher levels as combustion proceeds over a relatively prolonged period of time.

20. In an automatic stoking mechanism, the combination of a heater having a combustion chamber, means for feeding solid fuel into said combustion chamber, said feeding means including a trough, a rocking support for said trough and having the trough connected therewith for turning movement about an upwardly extending axis, means responsive to the turning movement of the trough about said upwardly extending axis for controlling the level of fuel in the combustion chamber, and means for rocking said trough on the rocking support automatically and progressively to adjust the fuel level in the combustion chamber as combustion proceeds with continued feeding over a prolonged period of time.

21. In an automatic stoking mechanism, the combination of a heater having a combustion chamber, means for feeding solid fuel into said combustion chamber and including power means therefor, a member mounted for movement in response to the rise in the level of fuel in the combustion chamber, and means for controlling said power means from the fuel level responsive member comprising a power take-off operatively connected with the power means and having a shaft, a rotatable member mounted on the shaft for normal rotation therewith, means operatively connecting said rotatable member with the fuel level responsive member for stopping the rotation of said rotatable member upon a rise in the fuel level in the combustion chamber, and means operatively connected with the rotatable member and actuated upon non-rotation thereof for discontinuing the operation of the fuel feeding means.

22. In an automatic stoking mechanism, the combination of a heater having a combustion chamber, means for feeding solid fuel to said combustion chamber, an electric motor for driving said feeding means, a member mounted in the chamber for movement in response to the rise of the level of fuel therein, and a control for said motor including a power take-off shaft operatively driven thereby, a rotatable disc mounted on said shaft for normal rotation therewith, means operatively connecting said rotatable disc with the fuel level responsive member for stopping the rotation of said rotatable disc upon a rise in the fuel level in the combustion chamber, a shift lever for controlling the drive from the electric motor to the fuel feeding means, an operating lever connected with the rotatable disc and actuated thereby upon non-rotation thereof, and toggle means operatively connecting said shift lever and operating lever together.

23. In an automatic stoking mechanism, a power device for operating fuel feeding means, said power device including a take-off shaft, said shaft having a threaded portion thereon, a rotatable member screw-threaded on said threaded portion of the shaft, means resiliently holding the rotatable member in screw-threaded engagement with the shaft for rotation therewith, said shaft having a smooth portion in axial alignment with the threaded portion, a connection with said rotatable member adapted to cause the same to move from the threaded portion onto the smooth portion when rotation of the rotatable member is resisted, and a control device for the power device operatively connected with the rotatable member and actuated thereby.

24. In a stoking device, the combination of a heater having a combustion chamber, a chute for directing fuel into the combustion chamber, a rocking member journaled on the heater and carrying the chute for turning movement to different vertical positions relative thereto, said rocking member having a laterally projecting arm, a screw shaft, a nut threaded on said screw shaft and having operative connection with the arm to tilt the same to different positions upon rotation of the screw shaft, a ratchet device operatively connected with the screw shaft for rotation thereof, and power means for actuating said ratchet device for progressive tilting action of the chute.

25. In a heating system, the combination of a heater having a combustion chamber arranged to provide a fire bed therein, fuel stoking mechanism arranged to supply fuel to said combustion chamber, said heater having an air opening into the combustion chamber over the top of the fire bed, check damper means for controlling said air opening, thermostatic means for operating said check damper means, and separate thermostatic means for controlling the operation of the fuel stoking mechanism, the respective thermostatic means being arranged adjacent each other, the first-mentioned thermostatic means being constructed for opening the check damper means to admit air over the top of the fuel bed at a slightly higher temperature than the actuation of the second-mentioned thermostatic means to stop the operation of the fuel stoking mechanism.

26. In a system adapted to transport solid fuel from a storage therein to a combustion-chamber having a grate, means for maintaining the level of solids in a fuel bed in said chamber and comprising: a fuel-feed member disposed for alternating movement and for contact with the solids at the upper surface of said fuel bed; operatively connected with said member, resilient means that are sensitive to a variation of a predetermined degree for pressure of contact between said member and fuel bed solids at a predetermined level for the upper surface of the bed; a motor operative by an electrical current to actuate fuel-transporting means for the fuel-feed member; and a motor control switch operable by said resilient means alternately to stop and to start said motor with alternate changes of pressure above or below the predetermined degree for contact-pressure between said fuel bed solids and said feed member.

27. Apparatus adapted to control the fuel bed level in a furnace by regulable delivery of solid fuel thereto comprising: a plate-like member adapted for alternating motion and adjustable in angularity in respect of and adjacent to a furnace firebox; a motor; means operable by said motor for driving a fuel-feeding means for said furnace; mechanism operable by said motor for driving said plate-like member, said mechanism including a member arranged for reciprocatory motion and having recoverably yieldable means operatively connected with said mechanism adapted to yield on the arrestment of the movement of said plate-like member by resistance of the fuel bed when the level of the fuel bed rises in the firebox into arresting relationship with said plate-like member, and adapted to recover, on release of the resistance of the fuel bed when its level recedes, so as to continue the movement of the member relative to the fuel bed, and a device operable to actuate controlling means of an electrical circuit for said motor, said device being connected with said mechanism so as to be operated by the yielding and recovery movements of its recoverably yielding means, to actuate the controlling means to stop the operation of the motor on the yielding movement, and to resume the operation of the motor on the recovery movement.

28. In apparatus adapted to control the fuel bed level in a furnace by regulable delivery of the fuel thereto, the combination comprising: a plate-like solid fuel introducing member that is adapted for alternating motion adjacent a fuel bed within the furnace firebox; means for adjusting the inclination of said plate-like member, thereby to prevent accumulation thereon of solid fuel introduced into said firebox; a motor; and a mechanism arranged for driving said member by said motor, said mechanism having a member disposed for reciprocatory motion and having recoverably yieldable means operatively connected therewith and yieldable to a predetermined pressure of said plate-like member against the fuel bed in said firebox and recoverable therefrom upon reduction of the resistance of the fuel bed thereagainst, and a device for reversal actuation of controlling means of an electrical circuit wherein said motor is included, said device being connected with said mechanism to be operated by the yielding and recovery actions of the recoverably yielding means to effect the reversal actuation of the controlling means.

29. In combination with a solid-fuel storage and a furnace having a grate adapted to support a fuel bed thereon, the combination of: means for transporting solid fuel from said storage to said fuel bed; and means for controlling the level of solids in said fuel bed on the grate, said means comprising an inclined, plate-like member mounted for alternating motion and for contact with the surface of said fuel bed, actuating means including a driving member for actuating said plate-like member, and recoverably yieldable means, said recoverably yieldable means being operatively connected with said plate-like member so as to withstand contact-pressures, of the fuel bed and to yield at a pressure above and recover at a pressure below a predetermined degree for contact-pressure between the plate-like member and the fuel bed, and switch means for controlling an electrical circuit that includes a motor for driving said fuel-transporting means, said switch means being cooperatively associated with the recoverably yieldable means so as to be actuated thereby to motor stopping position by the yielding movement and to motor starting position by the recovery movement of said recoverably yieldable means.

30. In an automatic fuel stoking mechanism for a heater, the combination of fuel feeding means, a fuel feeding device arranged to receive fuel from said feeding means and constructed for delivering fuel therefrom to a fuel bed in the heater, said device being disposed in position for contact with said fuel bed, means for moving said feeding device into contact with the fuel bed, and means for operatively connecting said feeding device with the fuel feeding means and constructed for controlling the feeding of fuel thereby in response to the obstruction by the height of the fuel bed in the heater to the movement of said device into contact with the fuel bed, whereby said feeding device delivers and distributes the fuel and automatically controls the quantity of fuel fed to the heater.

31. In an automatic fuel stoking mechanism, the combination of a heater having a combustion chamber adapted to contain a fuel bed therein, fuel feeding means, a fuel feeding member arranged in the combustion chamber in position for contact with the fuel bed, said feeding member being constructed for receiving fuel from the fuel feeding means and for delivering the same to the fuel bed, mechanical means for moving said member into contact with the fuel bed, and means for operatively connecting said feeding member with the fuel feeding means and constructed for controlling the feeding of fuel thereby in response to the obstruction by the height of the fuel bed in the heater to the movement of said device into contact with the fuel bed, whereby said member serves the three-fold function of delivering the fuel, distributing the fuel, and automatically controlling the quantity of fuel fed to the heater.

WESTON M. FULTON.